US011900849B2

(12) United States Patent
Lee et al.

(10) Patent No.: US 11,900,849 B2
(45) Date of Patent: Feb. 13, 2024

(54) DISPLAY DEVICE

(71) Applicant: SAMSUNG DISPLAY CO., LTD., Yongin-si (KR)

(72) Inventors: Bit Na Lee, Yongin-si (KR); Jeong Kyoo Kim, Yongin-si (KR); Myung Woo Lee, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/151,655

(22) Filed: Jan. 9, 2023

(65) Prior Publication Data

US 2023/0162641 A1 May 25, 2023

Related U.S. Application Data

(63) Continuation of application No. 17/342,589, filed on Jun. 9, 2021, now Pat. No. 11,551,599.

(30) Foreign Application Priority Data

Nov. 2, 2020 (KR) ........................ 10-2020-0144792

(51) Int. Cl.
*G09G 3/20* (2006.01)
*G09G 3/3275* (2016.01)
*G09G 5/06* (2006.01)

(52) U.S. Cl.
CPC ......... *G09G 3/2003* (2013.01); *G09G 3/3275* (2013.01); *G09G 5/06* (2013.01);
(Continued)

(58) Field of Classification Search
CPC ...... G09G 3/2003; G09G 3/3275; G09G 5/06; G09G 2300/0452; G09G 2300/0465;
(Continued)

(56) References Cited

U.S. PATENT DOCUMENTS 10,395,581 B2 8/2019 Kim et al.
2018/0374426 A1* 12/2018 Chen .................... G09G 3/3225
(Continued)

FOREIGN PATENT DOCUMENTS

| | | | |
|---|---|---|---|
| CN | 110914891 | A | 3/2020 |
| KR | 1020180049458 | A | 5/2018 |
| KR | 102117033 | B1 | 6/2020 |

*Primary Examiner* — Premal R Patel
(74) *Attorney, Agent, or Firm* — CANTOR COLBURN LLP

(57) ABSTRACT

A display device includes a display area including a first pixel area, in which pixels including subpixels of a first arrangement structure are disposed, and a second pixel area, in which pixels including subpixels of a second arrangement structure are disposed, a panel driver which provides a driving signal to the display area, and a data processor which converts first image data to second image data, where the first image data corresponds to the boundary subpixel of a first boundary pixel located adjacent to the second pixel area, among the pixels of the first pixel area, and the boundary subpixel of a second boundary pixel adjacent to the first boundary pixel, among the pixels of the second pixel area. The data processor determines the boundary subpixels of the first and second boundary pixels based on boundary types indicating positional relationships between the first and second boundary pixels.

18 Claims, 19 Drawing Sheets

(52) U.S. Cl.
CPC ............... *G09G 2300/0452* (2013.01); *G09G 2300/0465* (2013.01); *G09G 2310/027* (2013.01); *G09G 2310/0232* (2013.01)

(58) Field of Classification Search
CPC ..... G09G 2310/0232; G09G 2310/027; G09G 3/20; G09G 2320/0271; G09G 5/10; G09G 2340/0407; G09G 3/3208; G09G 3/3258; G09G 2320/0233
See application file for complete search history.

(56) References Cited

U.S. PATENT DOCUMENTS

| | | | | |
|---|---|---|---|---|
| 2019/0164521 | A1* | 5/2019 | Feng | G09G 3/3208 |
| 2019/0333438 | A1 | 10/2019 | Kim et al. | |
| 2020/0124927 | A1 | 4/2020 | Kim et al. | |
| 2021/0065625 | A1* | 3/2021 | Wang | H10K 59/35 |
| 2021/0407369 | A1* | 12/2021 | Li | G09G 3/2074 |
| 2021/0408164 | A1* | 12/2021 | Kang | H10K 59/351 |
| 2022/0059011 | A1 | 2/2022 | Li | H01L 27/326 |

* cited by examiner

FIG. 5C

| BOUNDARY TYPE | LUMINANCE RATIO (L_RATIO) |
|---|---|
| TYPE1 | R_RATIO = RL1'/RL<br>G_RATIO = GL1'/GL<br>B_RATIO = BL1'/BL |
| TYPE2 | R_RATIO = RL2'/RL<br>G_RATIO = GL2'/GL<br>B_RATIO = BL2'/BL |
| TYPE3 | R_RATIO = RL3'/RL<br>G_RATIO = GL3'/GL<br>B_RATIO = BL3'/BL |
| TYPE4 | R_RATIO = RL4'/RL<br>G_RATIO = GL4'/GL<br>B_RATIO = BL4'/BL |
| TYPE5 | R_RATIO = RL5'/RL<br>G_RATIO = GL5'/GL<br>B_RATIO = BL5'/BL |
| TYPE6 | R_RATIO = RL6'/RL<br>G_RATIO = GL6'/GL<br>B_RATIO = BL6'/BL |
| TYPE7 | R_RATIO = RL7'/RL<br>G_RATIO = GL7'/GL<br>B_RATIO = BL7'/BL |
| TYPE8 | R_RATIO = RL8'/RL<br>G_RATIO = GL8'/GL<br>B_RATIO = BL8'/BL |

AD(BPX1)

| | | | |
|---|---|---|---|
| EN(1bit) | TYPE(3bit) | Y(1bit) | X(1bit) |

FIG. 8

BPX2

| BOUNDARY TYPE | DIMMING SUBPIXEL (BSPX2) |
|---|---|
| TYPE1 | R, B |
| TYPE2 | R, B |
| TYPE3 | B |
| TYPE4 | G, B |
| TYPE5 | G, B |
| TYPE6 | R, G, B |
| TYPE7 | R, G |
| TYPE8 | R, G, B |

FIG. 9

AD

| | | | | | |
|---|---|---|---|---|---|
| EN(1bit) | PID1(2bit) | PID2(3bit) | TYPE(3bit) | Y(1bit) | X(1bit) |

DISPLAY DEVICE

This application is a continuation of U.S. patent application Ser. No. 17/342,589, filed on Jun. 9, 2021, which claims priority to Korean Patent Application No. KR 10-2020-0144792, filed on Nov. 2, 2020, and all the benefits accruing therefrom under 35 U.S.C. § 119, the content of which in its entirety is herein incorporated by reference.

BACKGROUND

1. Field

Embodiments of the disclosure relate to a display device, and more particularly, to a display device having a plurality of pixel arrangement structures.

2. Description of the Related Art

A display device may display an image using pixels (or pixel circuits). The display device may further include a sensor, a camera, and the like in a bezel (or an edge portion) on a front surface of the display device (e.g., a surface on which an image is displayed). Such a display device may recognize an object using an optical sensor, and may acquire pictures and video using the camera, for example.

Recently, research for arranging a camera or the like to overlap a pixel area has been conducted to minimize a bezel. In order to improve transmittivity in the pixel area under which the camera is disposed, the structure of pixels overlapping the corresponding area may be different from the structure of pixels in other areas.

SUMMARY

Embodiments of the disclosure are directed to a display device which corrects image data of boundary subpixels selected depending on the pixel arrangement for each boundary type.

An embodiment of the disclosure provides a display device including a display area including a first pixel area, in which pixels including subpixels of a first arrangement structure are disposed, and a second pixel area, in which pixels including subpixels of a second arrangement structure different from the first arrangement structure are disposed, a panel driver which provides a driving signal to the display area to display an image, and a data processor which converts first image data to second image data, where the first image data corresponds to each of a boundary subpixel of a first boundary pixel located adjacent to the second pixel area, among the pixels of the first pixel area, and a boundary subpixel of a second boundary pixel located adjacent to the first boundary pixel, among the pixels of the second pixel area. In such an embodiment, the data processor determines the boundary subpixel of the first boundary pixel and the boundary subpixel of the second boundary pixel based on a boundary type indicating a positional relationship between the first boundary pixel and the second boundary pixel.

According to an embodiment, a grayscale of a data signal supplied to at least one selected from the boundary subpixel of the first boundary pixel and the boundary subpixel of the second boundary pixel may be lower than a grayscale of a data signal supplied to a subpixel other than the boundary subpixel of the first boundary pixel and the boundary subpixel of the second boundary pixel when a same input image data is applied thereto.

According to an embodiment, the data processor may include an arrangement information storage including a lookup table which stores information about a position of the first boundary pixel and the boundary type as pixel arrangement information, and a dimming processor which lowers the luminance of the boundary subpixels by dimming for the first image data corresponding to the boundary subpixels based on the lookup table.

According to an embodiment, the pixel arrangement information included in the lookup table may further include information about the first arrangement structure and the second arrangement structure.

According to an embodiment, the dimming processor may include a luminance ratio storage which stores luminance ratios, each of which is a ratio between the luminance of a normal area and the luminance of a boundary area of a corresponding boundary type for a same grayscale, a grayscale gain storage which stores a grayscale gain corresponding to grayscales, a first calculator which generates corrected data by applying a luminance ratio, corresponding to the first image data, to the first image data, and a second calculator which generates the second image data by applying the grayscale gain, corresponding to the grayscale of the first image data, to the corrected data.

According to an embodiment, the luminance ratio storage may store the luminance ratios for respective colors of the subpixels.

According to an embodiment, the normal area may be a selected portion of the first pixel area.

According to an embodiment, each of the luminance ratios and the grayscale gain may be greater than 0 and equal to or less than 1.

According to an embodiment, as the grayscale is lower, the grayscale gain may decrease.

According to an embodiment, the grayscale gain may be 1 when the grayscale is equal to or less than a preset threshold grayscale.

According to an embodiment, the pixel arrangement information included in the lookup table may further include information about a first pixel identification corresponding to an arrangement structure of the subpixels included in the first pixel area and a second pixel identification corresponding to an arrangement structure of the subpixels included in the second pixel area.

According to an embodiment, the first pixel area may include a pixel array in which a first pixel, including a first subpixel and a second subpixel, and a second pixel, including a third subpixel and a fourth subpixel, are alternately arranged. In such an embodiment, the first subpixel may display a first color of light, the second subpixel and the fourth subpixel may display a second color of light, the third subpixel may display a third color of light, and the first color of light, the second color of light, and the third color of light may be different from each other.

According to an embodiment, the second pixel area may include a third pixel including a fifth subpixel, a sixth subpixel and a seventh subpixel which display different colors of light from each other. In such an embodiment, the fifth subpixel and the sixth subpixel may be arranged in a first direction, and the seventh subpixel may be located at one side of the fifth subpixel and the sixth subpixel.

According to an embodiment, the boundary type may include first to eighth boundary types set depending on a position at which the first boundary pixel and the second boundary pixel face each other and a direction in which the first boundary pixel is arranged. In such an embodiment, the data processor may include a lookup table in which information about the boundary subpixel of the first boundary pixel and the boundary subpixel of the second boundary pixel corresponding to each of the first to eighth boundary types is stored.

According to an embodiment, an aperture ratio of the second pixel area may be greater than an aperture ratio of the first pixel area.

An embodiment of the disclosure provides a display device including a display area including a first pixel area, in which pixels including subpixels of a first arrangement structure are disposed, and a second pixel area, in which pixels including subpixels of a second arrangement structure different from the first arrangement structure are disposed, a panel driver which provides a driving signal to the display area in order to display an image, and a data processor which converts first image data to second image data, where the first image data corresponds to each of a boundary subpixel of a first boundary pixel located adjacent to the second pixel area, among the pixels of the first pixel area, and a boundary subpixel of a second boundary pixel located adjacent to the first boundary pixel, among the pixels of the second pixel area. In such an embodiment, the grayscale of a data signal supplied to at least one selected from the boundary subpixel of the first boundary pixel and the boundary subpixel of the second boundary pixel is lower than the grayscale of a data signal supplied to a subpixel other than the boundary subpixel of the first boundary pixel and the boundary subpixel of the second boundary pixel when a same input image data is applied thereto.

According to an embodiment, the data processor may determine the boundary subpixel of the first boundary pixel and the boundary subpixel of the second boundary pixel based on a boundary type indicating a positional relationship between the first boundary pixel and the second boundary pixel.

According to an embodiment, the data processor may include an arrangement information storage including a lookup table which stores information about a position of the first boundary pixel and the boundary type as pixel arrangement information, and a dimming processor which lowers the luminance of the boundary subpixel by dimming for the first image data corresponding to the boundary subpixel based on the lookup table.

According to an embodiment, the dimming processor may include a luminance ratio storage which stores luminance ratios, each of which is a ratio between the average luminance of a portion of the first pixel area and the average luminance of a boundary area of a corresponding boundary type for a same grayscale, a grayscale gain storage which stores a grayscale gain corresponding to grayscales, and a calculator which generates the second image data by applying a luminance ratio and the grayscale gain, corresponding to the first image data, to the first image data.

An embodiment of the disclosure provides a display device including a display area comprising a first pixel area, in which pixels including subpixels of a first arrangement structure are disposed, and a second pixel area, in which pixels including subpixels of a second arrangement structure different from the first arrangement structure are disposed; a panel driver which provides a driving signal to the display area to display an image; and a data processor which converts first image data to second image data, wherein the first image data corresponds to a first boundary subpixel of a first boundary pixel located adjacent to the second pixel area, among the pixels of the first pixel area, and a second boundary subpixel of a second boundary pixel located adjacent to the first boundary pixel, among the pixels of the second pixel area. In such an embodiment, a resolution of the second pixel area may be lower than a resolution of the first pixel area.

According to an embodiment, the data processor may determine the boundary subpixel of the first boundary pixel and the boundary subpixel of the second boundary pixel based on a boundary type indicating a positional relationship between the first boundary pixel and the second boundary pixel.

According to an embodiment, the number of pixels per unit area in the first pixel area may be greater than the number of the pixels per unit area in the second pixel area.

According to an embodiment, distances between the pixels of the first pixel area may be smaller than distances between the pixels of the second pixel area.

According to an embodiment, a shortest distance between the first boundary subpixel and the second boundary subpixel may be shorter than the distances between the pixels of the second pixel area.

According to an embodiment, the shortest distance between the first boundary subpixel and the second boundary subpixel may be longer than the distances between the pixels of the first pixel area.

According to an embodiment, the first pixel area may include a pixel array in which a first pixel, including a first subpixel and a second subpixel, and a second pixel, including a third subpixel and a fourth subpixel, are alternately arranged.

According to an embodiment, the first subpixel may display a first color of light, the second subpixel and the fourth subpixel may display a second color of light, and the third subpixel may display a third color of light. The first color of light, the second color of light, and the third color of light may be different from each other.

According to an embodiment, the second pixel area may include a third pixel including a fifth subpixel, a sixth subpixel and a seventh subpixel which display different colors of light from each other, the fifth subpixel and the sixth subpixel may be arranged in a first direction, and the seventh subpixel may be located at one side of the fifth subpixel and the sixth subpixel.

According to an embodiment, sizes of the fifth, sixth, and seventh subpixels may be greater than sizes of the first, second, third, and fourth subpixels.

According to an embodiment, the pixels in rows adjacent to each other in the second pixel area may be located diagonally to each other with respect to the first direction.

BRIEF DESCRIPTION OF THE DRAWINGS

FIG. 5C is a diagram illustrating an embodiment of a luminance ratio stored in a luminance ratio storage included in the dimming processor of FIG. 5A.

FIG. 8 is a diagram illustrating an embodiment of a boundary subpixel of a second boundary pixel corresponding to a boundary type stored in the lookup table of FIG. 6.

FIG. 9 is a diagram illustrating an embodiment of pixel arrangement information included in a lookup table stored in the arrangement information storage of FIG. 4.

DETAILED DESCRIPTION

Figure 1:
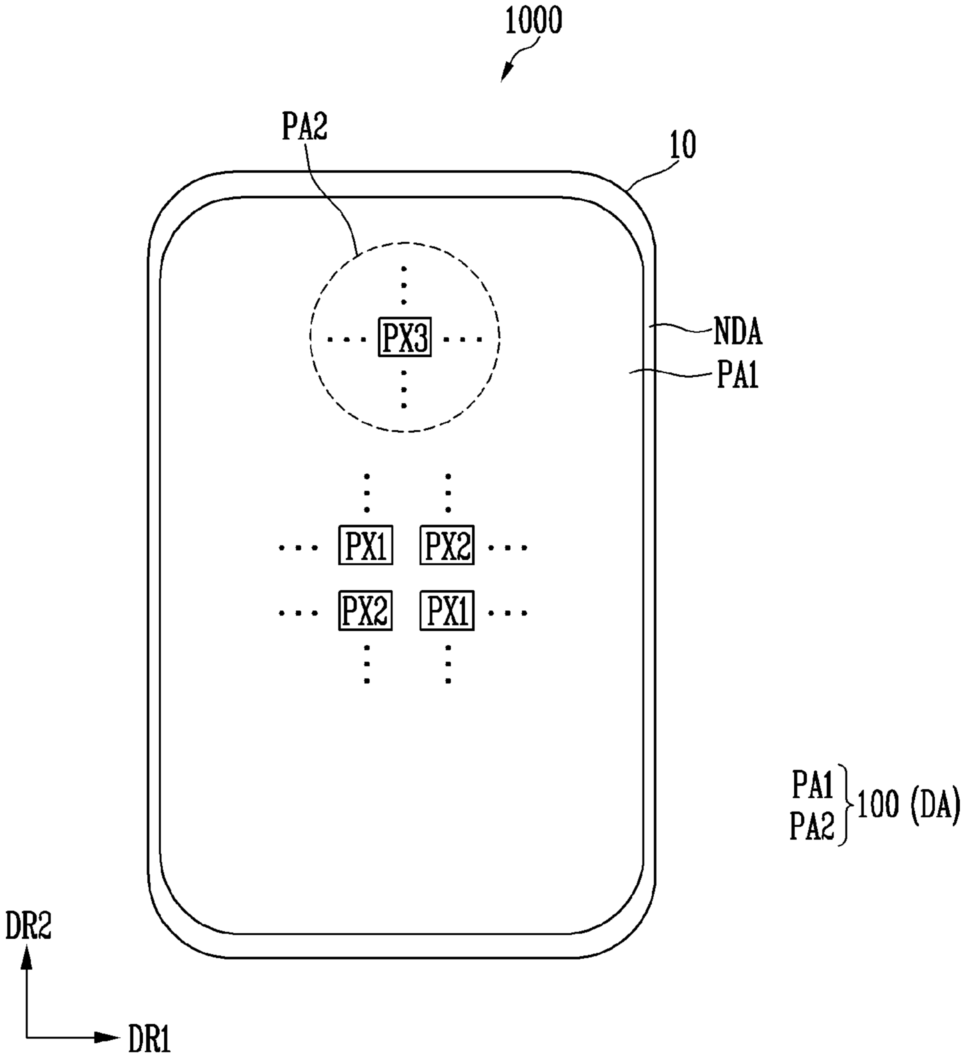
FIG. 1 is a diagram illustrating a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings. In the drawings, the same elements are denoted by the same reference numerals, and a repeated description of the same element will be omitted.

Figure 2:
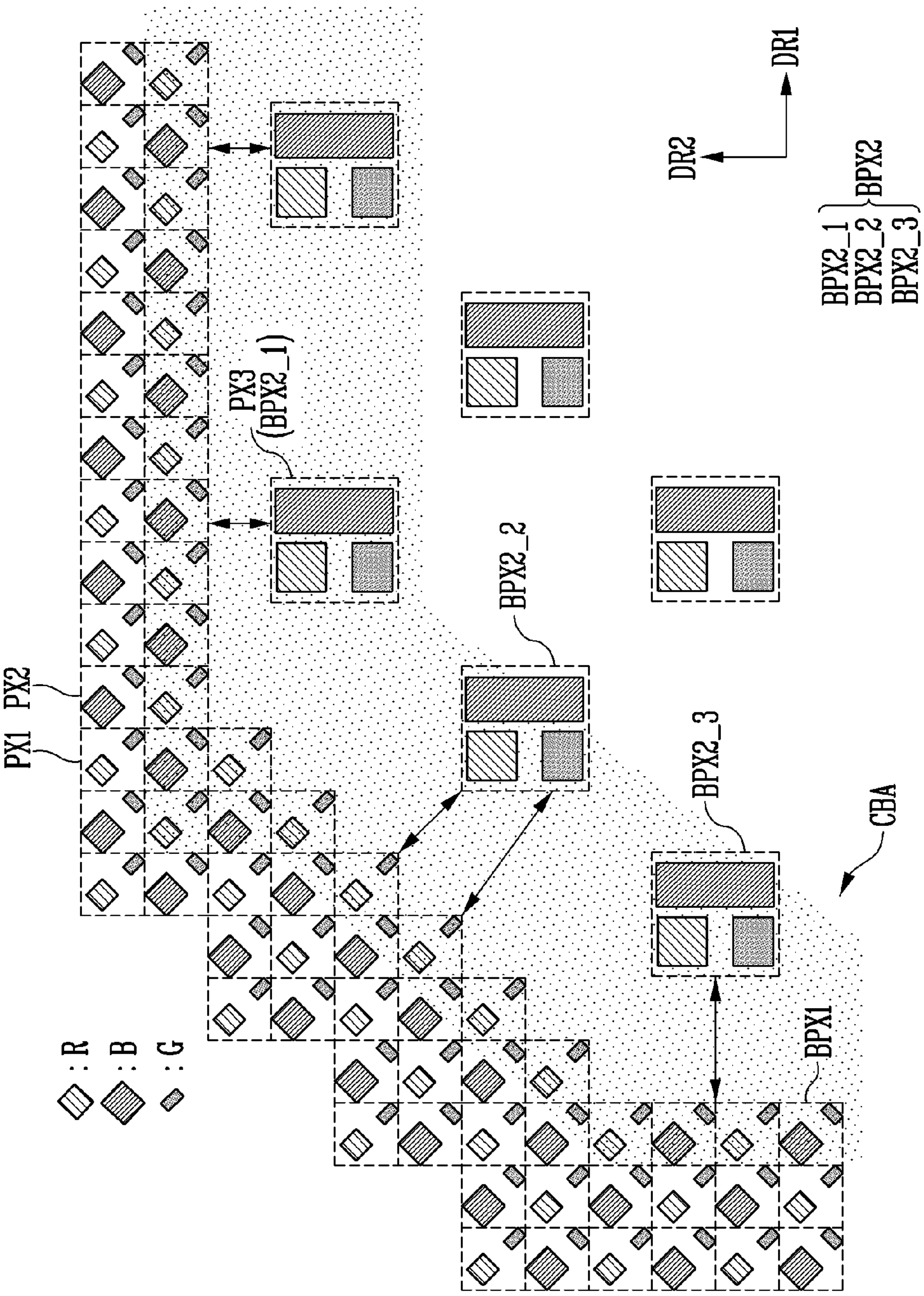
FIG. 2 is a diagram illustrating an embodiment of the display area of the display device of FIG. 1.

FIG. 1 is a diagram illustrating a display device according to an embodiment of the disclosure, and FIG. 2 is a diagram illustrating an embodiment of the display area of the display device of FIG. 1.

Referring to FIG. 1 and FIG. 2, an embodiment of the display device 1000 may include a display panel 10 including a display area 100. FIG. 2 schematically illustrates a portion including a boundary between a first pixel area PA1 and a second pixel area PA2 of FIG. 1.

The display panel 10 may include a display area DA and a non-display area NDA. In such an embodiment, pixels PX1, PX2 and PX3 may be disposed in the display area DA, and various kinds of drivers for driving the pixels PX1 and PX2 may be disposed in the non-display area NDA.

A display area DA may include the pixels PX1, PX2 and PX3. The display area 100 may include the first pixel area PA1 and the second pixel area PA2. In an embodiment, the first pixel PX1 and the second pixel PX2 may be disposed in the first pixel area PA1, and the third pixel PX3 may be disposed in the second pixel area PA2. In one embodiment, for example, the subpixel arrangement structures of the first to third pixels PX1, PX2 and PX3 may be different from each other.

In an embodiment, the first pixel PX1 and the second pixel PX2 may have a similar subpixel arrangement structure as each other. In one embodiment, for example, as illustrated in FIG. 2, the first pixel PX1 may include a first subpixel (e.g., a red (R) subpixel) and a second subpixel (e.g., a green (G) subpixel), and the second pixel PX2 may include a third subpixel (e.g., a blue (B) subpixel) and a fourth subpixel (e.g., a green (G) subpixel).

The first pixel PX1 and the second pixel PX2 may be alternately disposed in a first direction DR1 and a second direction DR2. A desired color of light may be output through a combination of red light, green light, and blue light output from the first pixel PX1 and the second pixel PX2 that are adjacent to each other.

In an embodiment, the third pixel PX3 may include a fifth subpixel (e.g., a red (R) subpixel), a sixth subpixel (e.g., a green (G) subpixel), and a seventh subpixel (e.g., a blue (B) subpixel). In one embodiment, for example, the fifth subpixel and the sixth subpixel may be arranged in the second direction DR2, and the seventh subpixel may be located on one side of the fifth and sixth subpixels.

According to an embodiment, the size of the third pixel PX3 (e.g., the emission extent of subpixels) may be greater than the sizes of the first and second pixels PX1 and PX2. In such an embodiment, the size of a driving transistor (e.g., a ratio between a channel width and a channel length, or the like) included in the third pixel PX3 may be different from the sizes of driving transistors (e.g., a ratio between a channel width and a channel length, or the like) included in the first and second pixels PX1 and PX2.

For example, sizes of the fifth, sixth, and seventh subpixels may be greater than sizes of the first, second, third, and fourth subpixels.

In embodiments of the disclosure, the shapes of the first to third pixels PX1, PX2 and PX3, the arrangement structure of subpixels thereof, and the sizes thereof are not limited to those described above. In one alternative embodiment, for example, each of the first and second pixels PX1 and PX2 may include a red (R) subpixel, a green (G) subpixel, and a blue (B) subpixel, or may include a red (R) subpixel, a green (G) subpixel, a blue (B) subpixel, and a white subpixel.

In an embodiment, the number (density) of first and second pixels PX1 and PX2 disposed in each unit area may be greater than the number (density) of third pixels PX3. In one embodiment, for example, where a single third pixel PX3 is disposed in a unit area, two first pixels PX1 and two second pixels PX2 may be included in a same area as the unit area. Accordingly, the resolution of the second pixel area PA2 may be lower than the resolution of the first pixel area PA1, and the aperture ratio of the second pixel area PA2 may be greater than the aperture ratio of the first pixel area PA1. For example, as illustrated in FIG. 2, the pixels PX3 in rows adjacent to each other in the second pixel area PA2 may be located diagonally to each other with respect to the second direction DR2 (and the first direction DR1).

In an embodiment, distances between the pixels PX1 and PX2 of the first pixel area PA1 may be smaller than distances between the pixels PX3 of the second pixel area.

Because the aperture ratio (and the light transmittivity) of the second pixel area PA2 is higher than that of the first pixel area PA1, a camera, an optical sensor, and the like may be disposed to overlap the second pixel area PA2. In one embodiment, for example, components, such as the camera, the optical sensor, and the like, may be located on a back side (or a lower portion) of the display panel 10 while overlapping the second pixel area PA2.

The optical sensor may include biometric sensors, such as a fingerprint sensor, an iris recognition sensor, an arterial sensor, or the like, but not being limited thereto. Alternatively, the optical sensor of photo-sensing type may further include a gesture sensor, a motion sensor, a proximity sensor, an illuminance sensor, an image sensor, or the like.

Because the arrangement structure of the first and second pixels PX1 and PX2 is different from the arrangement structure of the third pixels PX3, the luminance of light emitted from the first pixel area PA1 and the luminance of light emitted from the second pixel area PA2 may be different from each other when a same input grayscale is applied thereto. This luminance difference may be highly perceived in the boundary between the first pixel area PA1 and the second pixel area PA2, and a band of a specific color (referred to as a color band or a color band area ("CBA") hereinbelow) may be visible or recognized in the boundary. When light with high luminance (e.g., full-white) is emitted, such a CBA may be noticeably visible in the area in which the first and second pixels PX1 and PX2 are adjacent to the third pixel PX3. Particularly, such a CBA may be greatly affected by the color interference of light emitted by the most adjacent subpixels between the first pixel area PA1 and the second pixel area PA2.

In an embodiment of the disclosure, the display device 1000 and a method of driving the display device 1000 may dim light emitted from subpixels (boundary subpixels), corresponding to the boundary area between the first pixel area PA1 and the second pixel area PA2, (that is, correct image data) depending on the shape of the boundary area.

Figure 3:
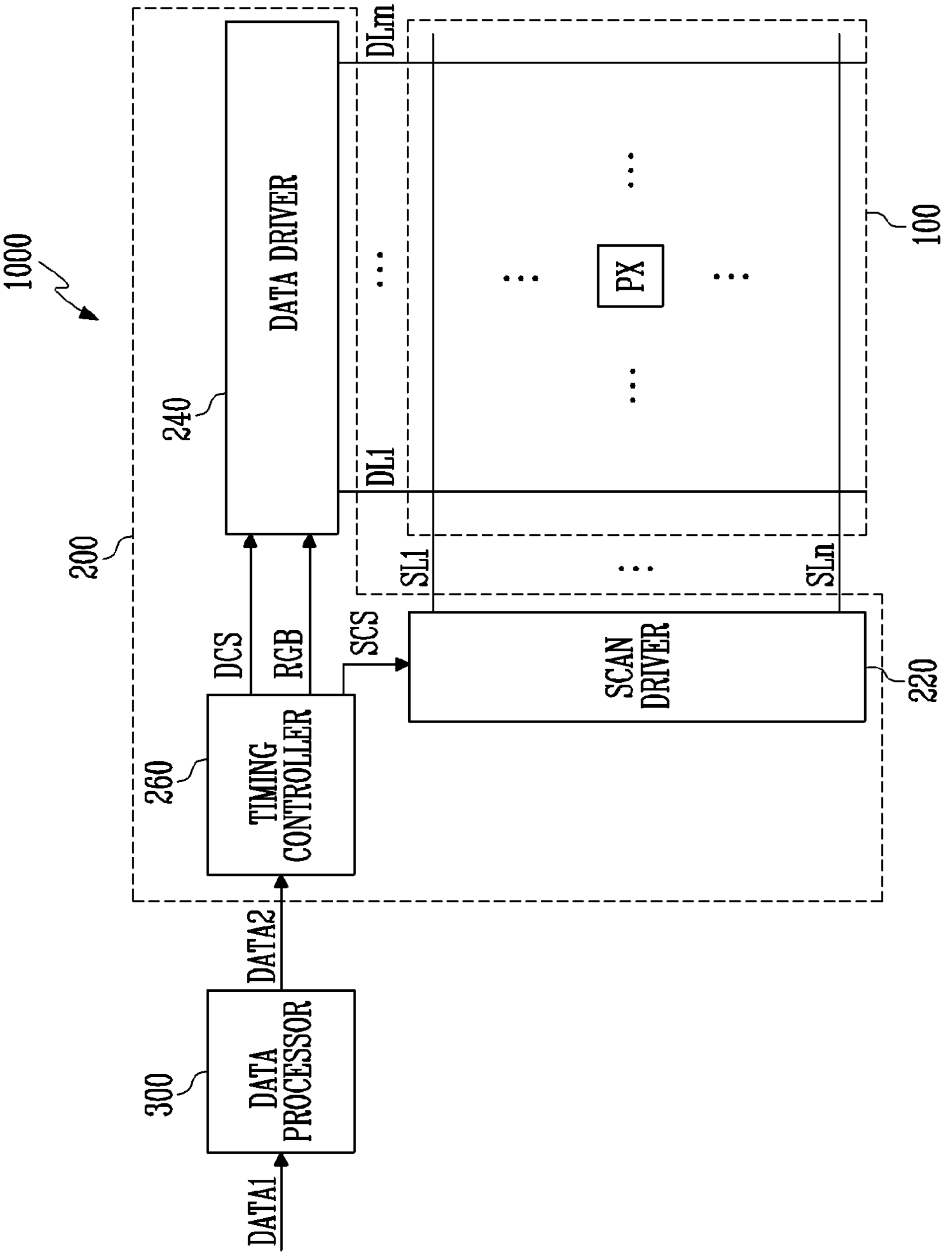
FIG. 3 is a block diagram illustrating a display device according to an embodiment of the disclosure.

FIG. 3 is a block diagram illustrating a display device according to embodiments of the disclosure.

Referring to FIGS. 1 to 3, an embodiment of the display device 1000 may include a display area 100, a panel driver 200, and a data processor 300.

In an embodiment, the display device 1000 may be a flat display device, a flexible display device, a curved display device, a foldable display device, a bendable display device, or a stretchable display device. In an embodiment, the display device 1000 may be applied to a transparent display device, a head-mounted display device, a wearable display device, or the like. In an embodiment, the display device 1000 may be applied to various electronic devices, such as a smartphone, a tablet personal computer ("PC"), a smart pad, a television ("TV"), a monitor, or the like.

In an embodiment, the display device 1000 may be implemented as a self-emissive display device including a plurality of self-emissive elements. In one embodiment, for example, the display device 1000 may be an organic light-emitting display device including organic light-emitting elements, a display device including inorganic light-emitting elements, or a display device including light-emitting elements formed of a combination of inorganic materials and organic materials, but not being limited thereto. Alternatively, the display device 1000 may be implemented as a liquid crystal display device, a plasma display device, a quantum dot display device, or the like.

The display area 100 may include scan lines SL1 to SLn and data lines DL1 to DLm, and may include pixels PX coupled to the scan lines SL1 to SLn and the data lines DL1 to DLm (where m and n are integers greater than 1). Each of the pixels PX may include a driving transistor and a plurality of switching transistors. In an embodiment, the display area 100 may include the first pixel area PA1 and the second pixel area PA2 as described above with reference to FIG. 1 and FIG. 2. The first pixel PX1 and the second pixel PX2 may be included in the first pixel area PA1, and the third pixel PX3 may be included in the second pixel area PA2.

The panel driver 200 may provide a driving signal to the display area 100 to display an image. In an embodiment, the panel driver 200 may include a scan driver 220, a data driver 240, and a timing controller 260.

The timing controller 260 may generate a first control signal SCS and a second control signal DCS in response to synchronization signals supplied from an outside. The first control signal SCS may be supplied to the scan driver 220, and the second control signal DCS may be supplied to the data driver 240. In an embodiment, the timing controller 260 may rearrange input image data including second image data DATA2 supplied from the data processor 300 and may supply the rearranged data RGB to the data driver 240.

The scan driver 220 may receive the first control signal SCS from the timing controller 260, and may supply scan signals to the scan lines SL1 to SLn based on the first control signal SCS. In one embodiment, for example, the scan driver 220 may sequentially supply scan signals to the scan lines SL1 to SLn.

The scan driver 220 may be embedded in a substrate through a thin film process. In an embodiment, the scan driver 220 may be located on both of opposite sides of the display area 100.

The data driver 240 may receive the second control signal DCS and the rearranged data RGB from the timing controller 260. The data driver 240 may convert the rearranged data RGB into a data signal in an analog form. The data driver 240 may supply data signals to the data lines DL1 to DLm in response to the second control signal DCS. The data signal may be supplied to the pixels PX selected in response to the scan signal.

In an embodiment, the panel driver 200 may further include an emission driver configured to supply an emission control signal to the pixels PX and a power supply configured to generate driving voltages for the display area 100, the scan driver 220, and the data driver 240.

In an embodiment, as shown in FIG. 3, the display device 1000 may include n scan lines SL1 to SLn and m data lines DL1 to DLm, where n and m are natural numbers, but the disclosure is not limited thereto. In one embodiment, for example, although not illustrated, additional dummy scan lines and/or dummy data lines may be further disposed in the display area 100.

The data processor 300 may correct first image data DATA1, among the input image data supplied from an external graphics source or the like, for second image data DATA2. In one embodiment, for example, the first image data DATA1 may be input image data corresponding to the boundary subpixels of the first boundary pixels BPX1 in the first pixel area PA1 and input image data corresponding to the boundary subpixels of the second boundary pixels BPX2 in the second pixel area PA2.

In an embodiment, the first boundary pixels BPX1 may be pixels included in the first pixel area PA1 while being closest to the second pixel area PA2. The second boundary pixels BPX2 may be pixels located adjacent to the first boundary pixels BPX1, among the pixels in the second pixel area PA2.

In an embodiment, a shortest distance between a first boundary subpixel of the first boundary pixels BPX1 and the second boundary subpixel of the second boundary pixels BPX2 may be shorter than the distances between the pixels PX3 of the second pixel area PA2. The shortest distance between the first boundary subpixel of the first boundary pixels BPX1 and the second boundary subpixel of the second boundary pixels BPX2 may be longer than the distances between the pixels PX1 and PX2 of the first pixel area PA1.

The data processor 300 may determine the boundary subpixels of the first and second boundary pixels BPX1 and BPX2 depending on boundary types indicating various positional relationships between the first boundary pixel BPX1 and the second boundary pixel BPX2.

In an embodiment, as illustrated in FIG. 1 and FIG. 2, the boundary type indicating the relative positional relationship between the first boundary pixel BPX1 and the second boundary pixel BPX2 may be represented in various forms depending on the border shape of the second pixel area PA2. In such an embodiment, subpixels adjacent to each other may be different depending on the direction in which the first boundary pixel BPX1 and the second boundary pixel BPX2 face each other.

In one embodiment, for example, in all of the first boundary pixels BPX1, the green (G) subpixels thereof may be closest to the second boundary pixels, e.g., first to third second boundary pixels BPX2_1 to BPX2_3 in the structure illustrated in FIG. 2. However, in the first second boundary pixel BPX2_1, the red (R) subpixel and the blue (B) subpixel thereof may be closest to the first boundary pixel BPX1, and in the second and third second boundary pixels BPX2_2 and BPX2_3, the red (R) subpixel and the green (G) subpixel thereof may be closest to the first boundary pixel BPX1.

When dimming is performed on image data corresponding to a subpixel, the subpixel is referred to as a boundary subpixel. Accordingly, in the first boundary pixels BPX1, the green (G) subpixels may be determined to be boundary subpixels. In the first second boundary pixel BPX2_1, the red (R) subpixel and the blue (B) subpixel may be determined to be boundary subpixels. In the second and third second boundary pixels BPX2_2 and BPX2_3, the red (R) subpixels and the green (G) subpixels may be determined to be boundary subpixels.

The grayscale of the second image data DATA2 may be corrected to be lower than the grayscale of the first image data DATA1. In one embodiment, for example, when the input image data applied to each subpixel is identical to each other, the grayscale of the data signal supplied to the boundary subpixel may be lower than the grayscale of the data signal supplied to a subpixel other than the boundary subpixel.

Accordingly, the luminance of the boundary subpixels of the first and second boundary pixels becomes lower, and a color band which may be visible in the boundary portion between the first pixel area PA1 and the second pixel area PA2 may be effectively prevented from being recognized by a viewer.

In an embodiment, the data processor 300 and the panel driver 200 may be separate components as shown in FIG. 3, but not being limited thereto. Alternatively, the functions of at least some of the data driver 240, the timing controller 260, and the data processor 300 may be integrated in the form of an integrated circuit ("IC").

Hereinafter, an embodiment of the data processor 300 will be described in detail with reference to FIGS. 4 to 13B.

Figure 4:
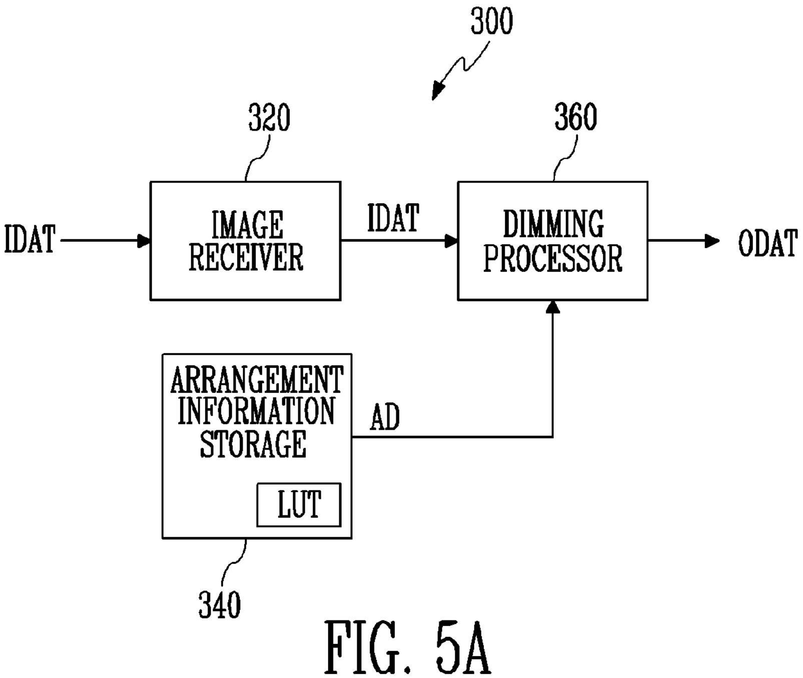
FIG. 4 is a block diagram illustrating an embodiment of a data processor included in the display device of FIG. 3.

FIG. 4 is a block diagram illustrating an embodiment of a data processor included in the display device of FIG. 3.

Referring to FIGS. 1 to 4, an embodiment of the data processor 300 may include an image receiver 320, an arrangement information storage 340, and a dimming processor 360.

The image receiver 320 may receive input image data IDAT corresponding to an area, and may supply the input image data IDAT to the dimming processor 360. In one embodiment, for example, the image receiver 320 may receive the input image data IDAT from an image source device (e.g., a graphics processor, or the like).

The arrangement information storage 340 may include a lookup table LUT which stores information about the position of the first boundary pixel and a boundary type as pixel arrangement information. In an embodiment, the lookup table LUT may include information about the position of a boundary pixel and a boundary subpixel for which luminance dimming (or grayscale dimming) is to be performed. In such an embodiment, the dimming processor 360 may correct image data for the data (e.g., the first image data DATA1) for which dimming processing is to be performed, among the input image data IDAT, based on the pixel arrangement information AD in the lookup table LUT.

In one embodiment, for example, the arrangement information storage 340 may include a non-volatile memory device, such as an erasable programmable read-only memory ("EPROM"), an electrically erasable programmable read-only memory ("EEPROM"), a flash memory, a phase-change random-access memory ("PRAM"), or the like.

The dimming processor 360 may perform a dimming operation for first image data DATA1 corresponding to the boundary subpixels of the first and second boundary pixels BPX1 and BPX2, among the input image data IDAT, based on the pixel arrangement information AD. The dimming processor 360 may correct or covert the first image data DATA1 to the second image data DATA2 based on the pixel arrangement information AD to lower the luminance of the boundary subpixels. The dimming processor 360 may provide output image data ODAT including the second image data DATA2 to the timing controller 260.

In an embodiment, the dimming level (e.g., the luminance ratio) applied to the boundary subpixels may vary depending on the boundary type. In such an embodiment, the dimming level (e.g., the luminance ratio) applied to the boundary subpixels may vary depending on the color of the boundary subpixel. A calculation of the luminance ratio will be described later in detail with reference to FIG. 5A.

In an embodiment, the dimming level may be adjusted depending on the grayscale of the first image data DATA1. In one embodiment, for example, the grayscale gain value applied to the first image data DATA1 may be adjusted depending on the grayscale corresponding to the boundary subpixel.

In an embodiment, as described above, the dimming processor 360 may adjust the degree of dimming (grayscale correction) based on at least one selected from a boundary type, the color of the boundary subpixel, and the grayscale of the first image data DATA1.

Figure 5A:
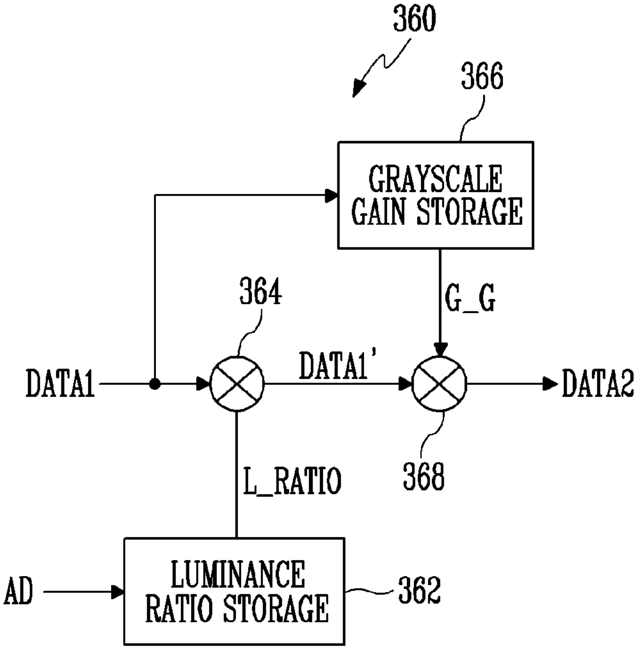
FIG. 5A is a block diagram illustrating an embodiment of a dimming processor included in the data processor of FIG. 4.
Figure 5B:
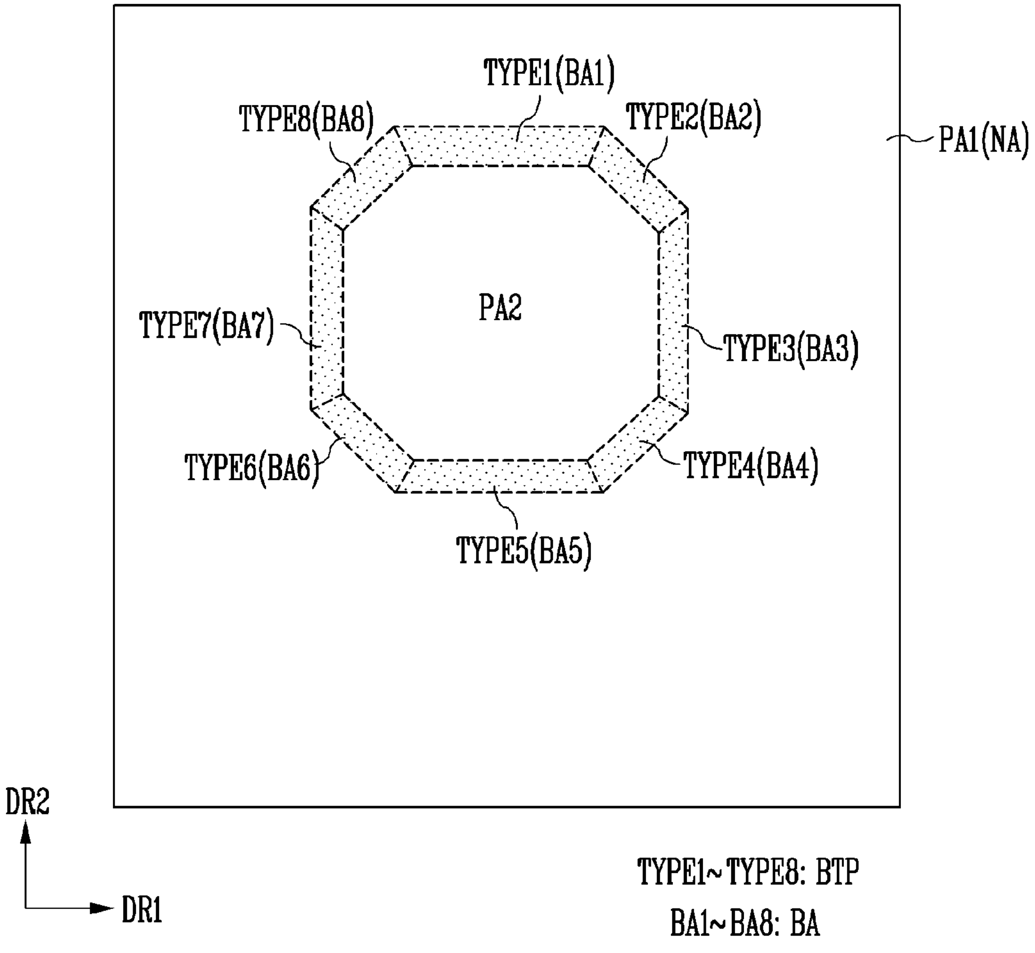
FIG. 5B is a diagram illustrating an embodiment of a boundary area and a boundary type of a display area.
Figure 5D:
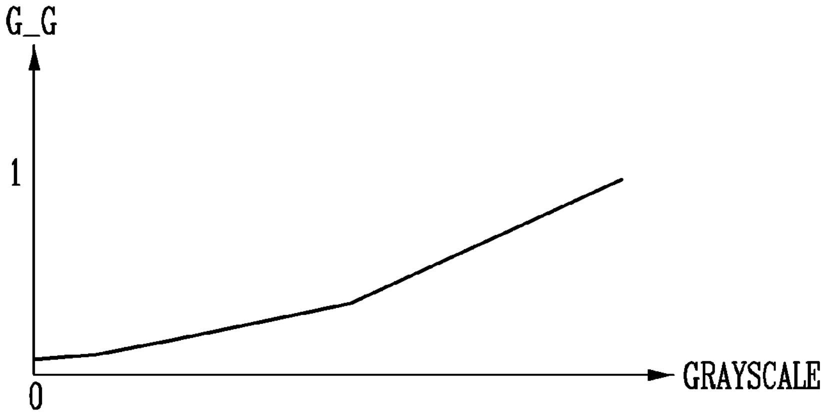
FIGS. 5D and 5E are graphs illustrating embodiments of grayscale gain stored in a grayscale gain storage included in the dimming processor of FIG. 5A.
Figure 5E:
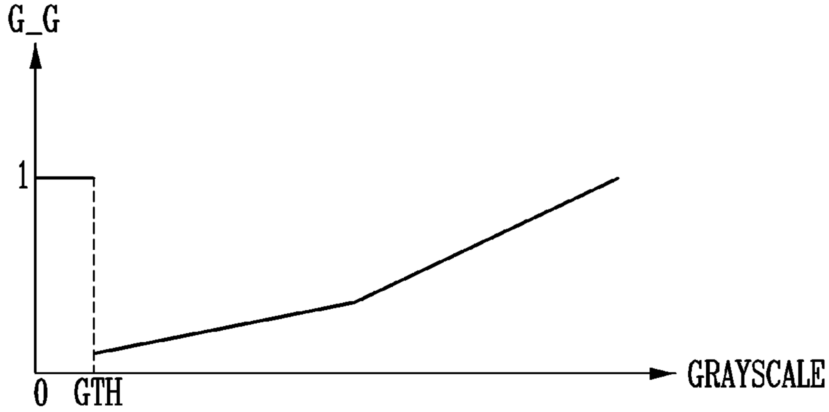

FIG. 5A is a block diagram illustrating an embodiment of a dimming processor included in the data processor of FIG. 4, FIG. 5B is a diagram illustrating an embodiment of the boundary area of a display area and boundary types, FIG. 5C is a diagram illustrating an embodiment of luminance ratios stored in a luminance ratio storage included in the dimming processor of FIG. 5A, and FIG. 5D and FIG. 5E are graphs illustrating embodiments of grayscale gain stored in a grayscale gain storage included in the dimming processor of FIG. 5A.

Referring to FIG. 1, FIG. 2, FIG. 5A, FIG. 5B, FIG. 5C and FIG. 5D, an embodiment of the dimming processor 360 may include a luminance ratio storage 362, a grayscale gain storage 366, a first calculator 364, and a second calculator 368.

The luminance ratio storage 362 may store luminance ratios L_RATIO, each of which is a ratio between the luminance of a normal area NA and the luminance of a boundary area BA of each boundary type BTP for a same grayscale. The luminance ratio storage 362 may include a non-volatile memory. In an embodiment, the luminance ratio L_RATIO may be stored in a lookup table LUT.

The boundary area BA indicates the boundary between the first pixel area PA1 and the second pixel area PA2, and may include first boundary pixels BPX1 and second boundary pixels BPX2. In an embodiment, the boundary area BA may have an octagonal shape, as illustrated in FIG. 5B, and may be divided into first to eighth boundary areas BA1 to BA8 depending on the relative positional relationship between the second boundary pixel BPX2 therein and the first boundary pixel BPX1 adjacent thereto. In one embodiment, for example, as described above with reference to FIG. 2, the relative positional relationships between the first boundary pixel BPX1 and the second boundary pixel BPX2 are different from each other in the first to eighth boundary areas BA1 to BA8.

The first to eighth boundary areas BA1 to BA8 may correspond to first to eighth boundary types TYPE1 to TYPE8, respectively.

The normal area NA may be a portion excluding the boundary area BA in the display area DA. In one embodiment, for example, the normal area NA may be a portion of the first pixel area PA1.

The luminance ratio storage 362 may store the luminance ratios L_RATIO of the first to eighth boundary types TYPE1 to TYPE8, which are predetermined through luminance detection, such as surface-capturing or the like, e.g., before shipment after manufacturing the display device 1000.

In an embodiment, the luminance data corresponding to each of the subpixels may be calculated by capturing an image of the display area 100 emitting light with the maximum grayscale (e.g., full white). Here, the boundary area BA and the normal area NA may be more clearly separated using a Gaussian filter or the like. Hereinafter, an embodiment of the method of storing the first to third luminance ratios R_RATIO, G_RATIO, and B_RATIO corresponding to the first boundary type TYPE1 will be described in detail.

The reference luminance of the normal area NA may be calculated from luminance data acquired by capturing. The reference luminance may be the average of luminance data of a predetermined area. The reference luminance may include red reference luminance RL, green reference luminance GL, and blue reference luminance BL according to subpixels. In one embodiment, for example, the red reference luminance RL may be the average luminance of the predetermined red (R) subpixels extracted from the normal area NA.

The boundary luminance of the first boundary area BA1 may be calculated from luminance data acquired by capturing. The boundary luminance may be the average of luminance data of a predetermined area of the first boundary area BA1. The boundary luminance may include red boundary luminance RL1', green boundary luminance GL1', and blue boundary luminance BL1' according to subpixels.

The first luminance ratio R_RATIO may be a value acquired by dividing the red boundary luminance RL1' by the red reference luminance RL. The second luminance ratio G_RATIO may be a value acquired by dividing the green boundary luminance GL1' by the green reference luminance GL. The third luminance ratio B_RATIO may be a value acquired by dividing the blue boundary luminance BL1' by the blue reference luminance BL. The first luminance ratio R_RATIO may be applied to a red (R) boundary subpixel, the second luminance ratio G_RATIO may be applied to a green (G) boundary subpixel, and the third luminance ratio B_RATIO may be applied to a blue (B) boundary subpixel.

Here, the luminance of the first boundary area BA1 may be lower than the luminance of the normal area NA on average. Accordingly, each of the first to third luminance ratios R_RATIO, G_RATIO, and B_RATIO may be greater than 0 and equal to or less than 1.

Using the above-described method, the first to third luminance ratios R_RATIO, G_RATIO, and B_RATIO for the second to eighth boundary types TYPE2 to TYPE8 may also be set. The first luminance ratio R_RATIO of each of the second to eighth boundary types TYPE2 to TYPE8 may be a value acquired by dividing the red boundary luminance (each of RL2' to RL8') by the red reference luminance RL. The second luminance ratio G_RATIO of each of the second to eighth boundary types TYPE2 to TYPE8 may be a value acquired by dividing the green boundary luminance (each of GL2' to GL8') by the green reference luminance GL. The third luminance ratio B_RATIO of each of the second to eighth boundary types TYPE2 to TYPE8 may be a value acquired by dividing the blue boundary luminance (each of BL2' to BL8') by the blue reference luminance BL.

Based on pixel arrangement information AD, the luminance ratio L_RATIO corresponding to the boundary type BTP may be loaded from the luminance ratio storage 362.

The first calculator 364 may generate corrected data DATA1' by applying the luminance ratio L_RATIO, corresponding to first image data DATA1, to the first image data DATA1. The first calculator 364 may include a multiplier. In one embodiment, for example, red image data may be multiplied by the first luminance ratio R_RATIO corresponding thereto.

The grayscale gain storage 366 may store grayscale gain G_G corresponding to all grayscales. In an embodiment, the grayscale gain storage 366 may include a non-volatile memory.

Because the above-described luminance ratio L_RATIO is a value calculated based on the maximum grayscale, when the grayscale is lower than that, a value lower than the set luminance ratio L_RATIO may be applied to the first image data DATA1. In one embodiment, for example, when the grayscale of the first image data DATA1 is lower than the maximum grayscale, the luminance ratio L_RATIO may decrease. Accordingly, the grayscale gain G_G may be greater than 0 and equal to or less than 1.

In an embodiment, the lower the grayscale is, the lower the grayscale gain G_G becomes, as illustrated in FIG. 5D. However, in a case where the luminance of emitted light is low in a low grayscale area, the luminance ratio L_RATIO may not be further lowered. In one embodiment, for example, the grayscale gain G_G for a low grayscale equal to or less than a predetermined threshold grayscale GTH may be set to 1, as illustrated in FIG. 5E. In one embodiment, for example, the threshold grayscale GTH may be set to the grayscale of 31.

The second calculator 368 may generate second image data DATA2 by applying the grayscale gain G_G, corresponding to the grayscale of the first image data DATA1, to the corrected data DATA1'. The second calculator 368 may include a multiplier. In one embodiment, for example, when the first image data DATA1 of the grayscale of 100 is supplied, the corrected data DATA1' may be multiplied by the grayscale gain G_G corresponding thereto.

Accordingly, in an embodiment, the grayscale of the second image data DATA2 may be lower than the grayscale of the first image data DATA1. Accordingly, dimming may be performed on the image data corresponding to the boundary pixels BPX1 and BPX2 of the boundary area BA.

In such an embodiment, the dimming level (the grayscale of the second image data DATA2) may be adaptively set for a same input grayscale depending on the boundary type BTP, the color of the boundary subpixel, and the grayscale supplied to the boundary subpixel.

Figures 6, 7A:
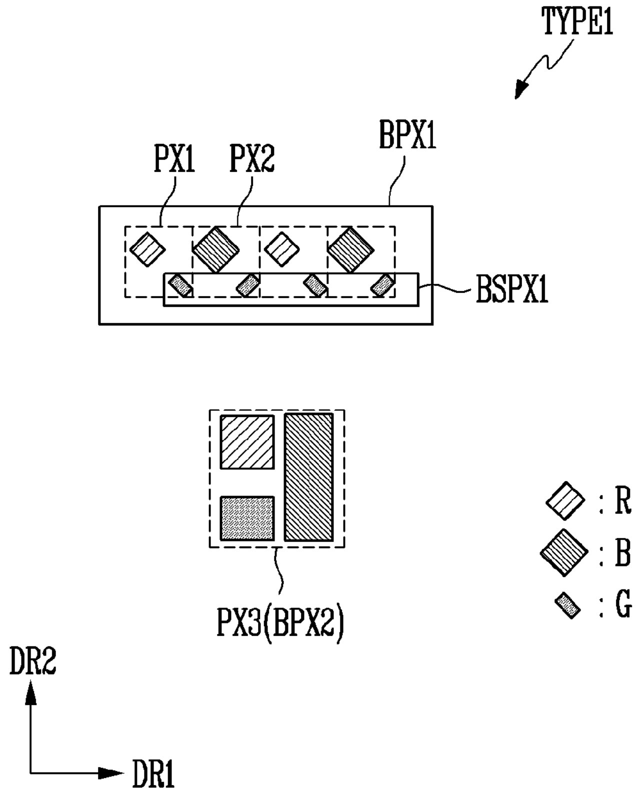
FIG. 6 is a diagram illustrating an embodiment of pixel arrangement information included in a lookup table stored in the arrangement information storage of FIG. 4.
FIGS. 7A to 7H are diagrams illustrating embodiments of the boundary type in which boundary pixels are arranged depending thereon.

FIG. 6 is a diagram illustrating an embodiment of pixel arrangement information included in the lookup table stored in the arrangement information storage of FIG. 4, and FIGS. 7A to 7H are diagrams illustrating embodiments of the boundary type in which boundary pixels are disposed depending thereon.

Referring to FIG. 1, FIG. 4, FIG. 6, and FIGS. 7A to 7H, the arrangement information storage 340 may store the pixel arrangement information AD of the first boundary pixel BPX1 in the form of a lookup table LUT.

In an embodiment, an embodiment of the pixel arrangement information of the first boundary pixel BPX1 may be represented using six bits, as illustrated in FIG. 6. In one embodiment, for example, whether a pixel disposed at predetermined coordinates in the display area 100 is a first boundary pixel BPX1 may be determined based on a single enable bit EN.

Eight boundary types TYPE1 to TYPE8 may be represented using three bits. In one embodiment, for example, the first to eighth boundary types TYPE1 to TYPE8 may correspond to pixel arrangement structures of FIGS. 7A to 7H, respectively. Depending on the digital value of the boundary types TYPE1 to TYPE8, a corresponding boundary type may be selected.

In an embodiment, the first boundary pixel BPX1 may be one of the first pixel PX1 and the second pixel PX2, which are described above with reference to FIG. 2. Because the first pixel PX1 and the second pixel PX2 are alternately disposed in the first direction DR1 and the second direction DR2, the boundary subpixels of the first boundary pixel BPX1 (referred to as first boundary subpixels BSPX1 hereinbelow) may be determined based on whether the pixel is located in an odd-numbered pixel column and an odd-numbered pixel row. In one embodiment, for example, boundary subpixels for which dimming is to be performed may be determined by determining an odd-numbered column and an odd-numbered row in each of the boundary types TYPE1 to TYPE8.

In an embodiment, when a row bit Y is 0, the coordinates of the boundary pixel BPX1 may be in an odd-numbered row, whereas when the row bit Y is 1, the coordinates of the boundary pixel BPX1 may be in an even-numbered row. In such an embodiment, when a column bit X is 0, the coordinates of the boundary pixel BPX1 may be in an odd-numbered column, whereas when the column bit X is 1, the coordinates of the boundary pixel BPX1 may be in an even-numbered column.

In the first boundary type TYPE1, the first boundary pixels BPX1 may be disposed on the upper side of the second boundary pixel BPX2 and arranged in the first direction DR1, as illustrated in FIG. 7A. In the first boundary type TYPE1, as shown in FIG. 7A, the green (G) subpixels of both of the first and second pixels PX1 and PX2 may be closest to the second boundary pixel BPX2. Accordingly, the green (G) subpixels may be determined to be the first boundary subpixels BSPX1, and image data corresponding to the green (G) subpixels may be dimmed.

Figure 7B:
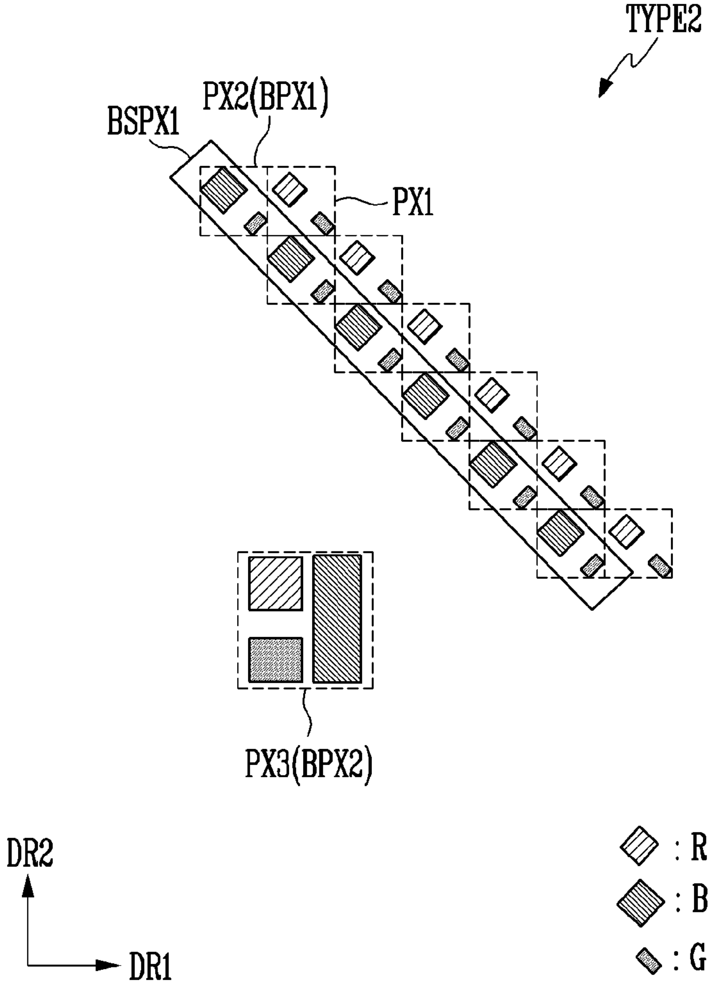

In the second boundary type TYPE2, the first boundary pixels BPX1 may be arranged substantially in a diagonal direction from the upper side of the second boundary pixel BPX2 to the right side of the second boundary pixel BPX2, as illustrated in FIG. 7B. In an embodiment, the diagonal arrangement of the first and second pixels PX1 and PX2 may be in a form in which each of the pixels is shifted by one pixel in the first direction DR1 on the coordinates of the first pixel area PA1.

Accordingly, the first boundary pixels BPX1 may be first pixels PX1 or second pixels PX2. In an embodiment, as shown in FIG. 7B, the first boundary pixels BPX1 may be the second pixels PX2, and the blue (B) subpixels and green (G) subpixels of the second pixels PX2 that are closest to the second boundary pixel BPX2 may be determined to be the first boundary subpixels BSPX1.

In an alternative embodiment, in the second boundary type TYPE2, the first boundary pixels BPX1 may be the first pixels PX1. In such an embodiment, the first boundary subpixels BSPX1 may be red (R) subpixels and green (G) subpixels.

Figure 7C:
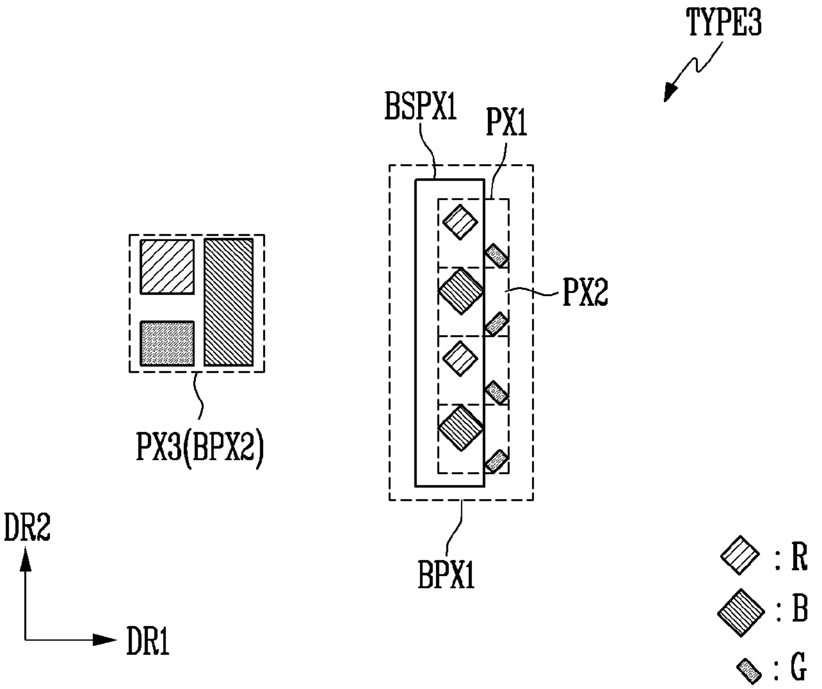

In the third boundary type TYPE3, the first boundary pixels BPX1 may be arranged on the right side of the second boundary pixel BPX2 in the direction opposite to the second direction DR2 (e.g., in the vertical direction), as illustrated in FIG. 7C. Accordingly, the alternately arranged first pixel PX1 and second pixel PX2 may be the first boundary pixels BPX1. Here, the subpixels adjacent to the second boundary pixel BPX2 may be different depending on the coordinates of the first boundary pixel BPX1.

In one embodiment, for example, the first pixel PX1 may be disposed in an odd-numbered column and odd-numbered row as the first boundary pixel BPX1, or may be disposed in an even-numbered column and even-numbered row. In such an embodiment, the second pixel PX2 may be disposed in an even-numbered column and even-numbered row as the first boundary pixel BPX1, or may be disposed in an odd-numbered column and odd-numbered row.

In the third boundary type TYPE3, the red (R) subpixel of the first pixel PX1 and the blue (B) subpixel of the second pixel PX2 may be determined to be the first boundary subpixels BSPX1.

Figure 7D:
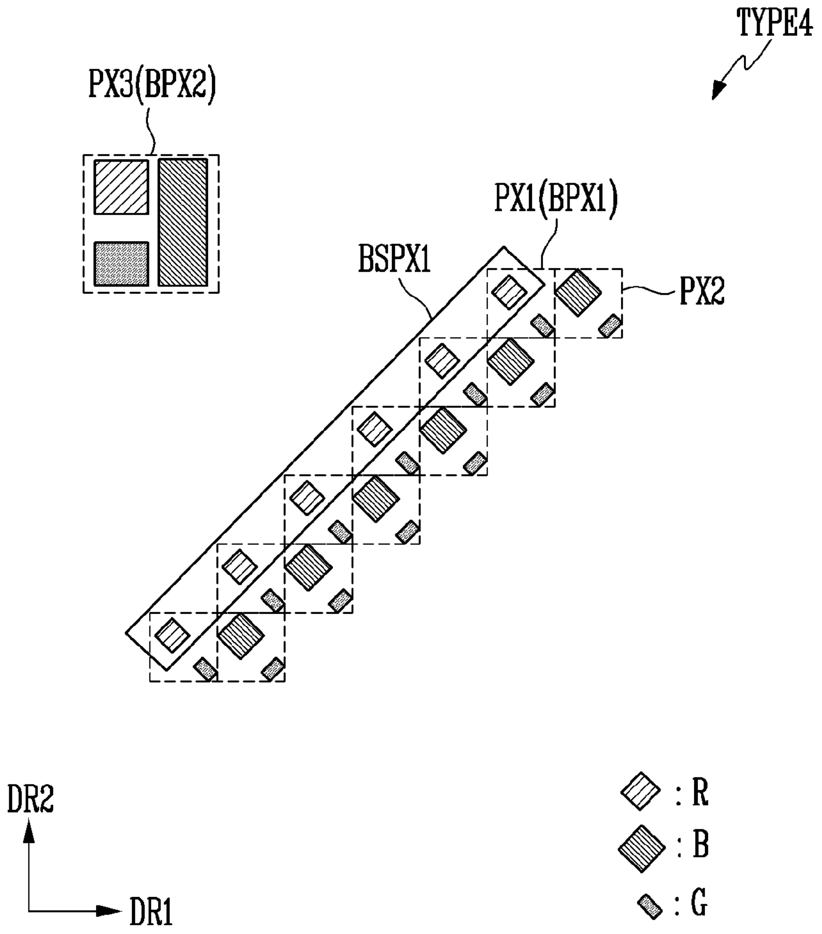

In the fourth boundary type TYPE4, the first boundary pixels BPX1 may be arranged substantially in a diagonal direction from the right side of the second boundary pixel BPX2 to the lower side of the second boundary pixel BPX2, as illustrated in FIG. 7D. The diagonal arrangement of the first and second pixels PX1 and PX2 may be in a form in which each of the pixels is shifted by one pixel in the first direction DR1 on the coordinates of the first pixel area PA1.

The first boundary pixels BPX1 may be the first pixels PX1 or the second pixels PX2. In an embodiment, as shown in FIG. 7D, the first boundary pixels BPX1 may be the first pixels PX1. In such an embodiment, the subpixels included in each of the first pixels PX1 and second pixels PX2 may be diagonally arranged. Accordingly, the red (R) subpixels of the first pixels PX1 closest to the second boundary pixel BPX2 may be determined to be the first boundary subpixels BSPX1.

In an alternative embodiment, in the fourth boundary type TYPE4, the first boundary pixels BPX1 may be the second pixels PX2. In such an embodiment, the first boundary subpixels BSPX1 may be blue (B) subpixels.

Figure 7E:
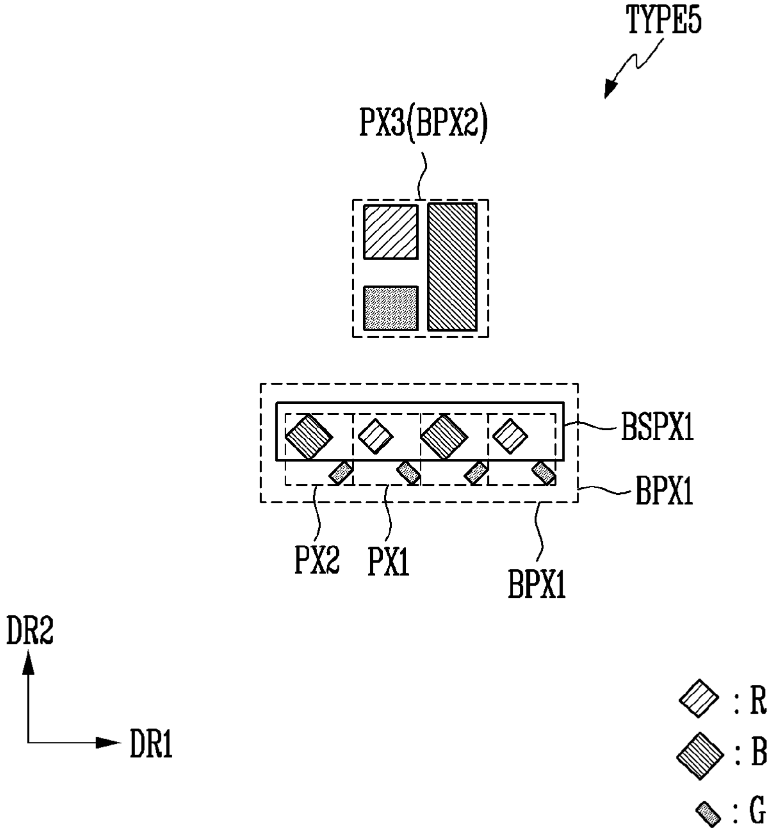

In the fifth boundary type TYPE5, the first boundary pixels BPX1 may be arranged on the lower side of the second boundary pixel BPX2 in the first direction DR1, as illustrated in FIG. 7E. Accordingly, the alternately arranged first pixel PX1 and second pixel PX2 may be the first boundary pixels BPX1. In such an embodiment, the subpixels adjacent to the second boundary pixel BPX2 corresponding to the first boundary pixels BPX1 may be different depending on the coordinates of the first boundary pixel BPX1.

In the fifth boundary type TYPE5, the red (R) subpixel of the first pixel PX1 and the blue (B) subpixel of the second pixel PX2 may be determined to be the first boundary subpixels BSPX1, similar to the third boundary type TYPE3.

Figure 7F:
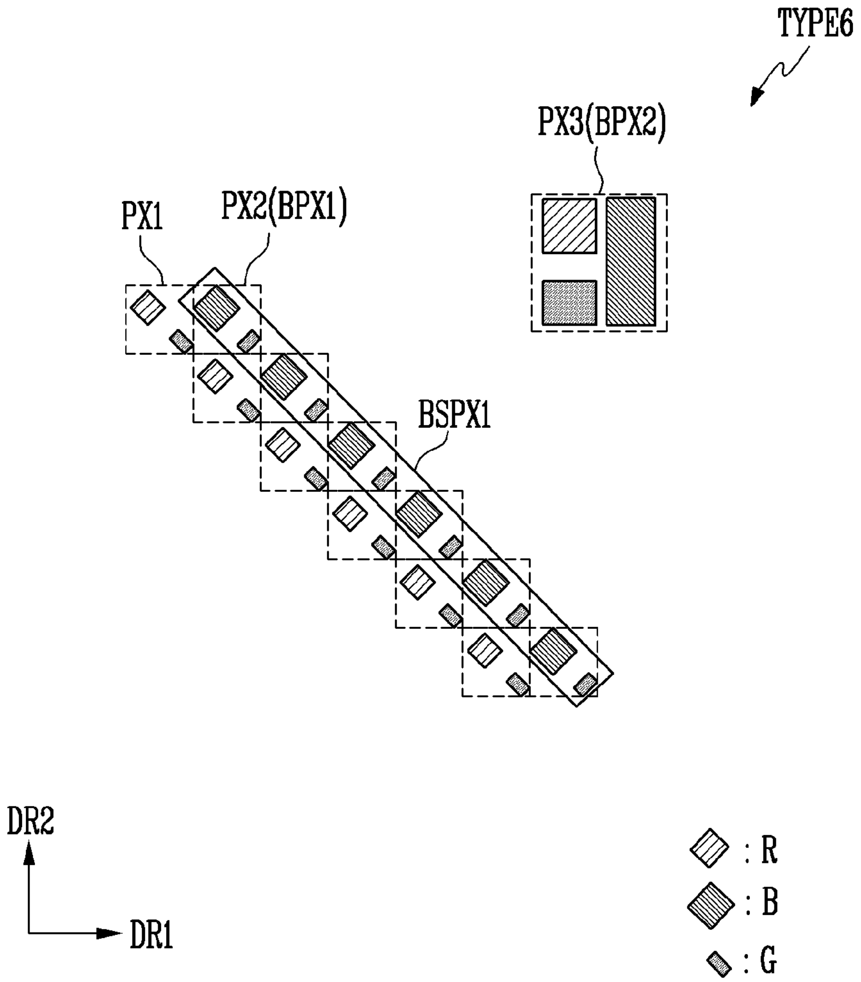

In the sixth boundary type TYPE6, the first boundary pixels BPX1 may be arranged in a diagonal direction from the lower side of the second boundary pixel BPX2 to the left side of the second boundary pixel BPX2, as illustrated in FIG. 7F. In an embodiment, the diagonal arrangement of the first and second pixels PX1 and PX2 may be a form in which each of the pixels is shifted by one pixel in the first direction DR1 on the coordinates of the first pixel area PA1.

Accordingly, the first boundary pixels BPX1 may be an array of the first pixels PX1 or an array of the second pixels PX2. In an embodiment, as shown in FIG. 7F, the first boundary pixels BPX1 may be the second pixels PX2, and the blue (B) subpixels and green (G) subpixels of the second pixels PX2 closest to the second boundary pixel BPX2 may be determined to be the first boundary subpixels BSPX1.

In an alternative embodiment, in the sixth boundary type TYPE6, the first boundary pixels BPX1 may be the first pixels PX1. In such an embodiment, the first boundary subpixels BSPX1 may be red (R) subpixels and green (G) subpixels.

Figure 7G:
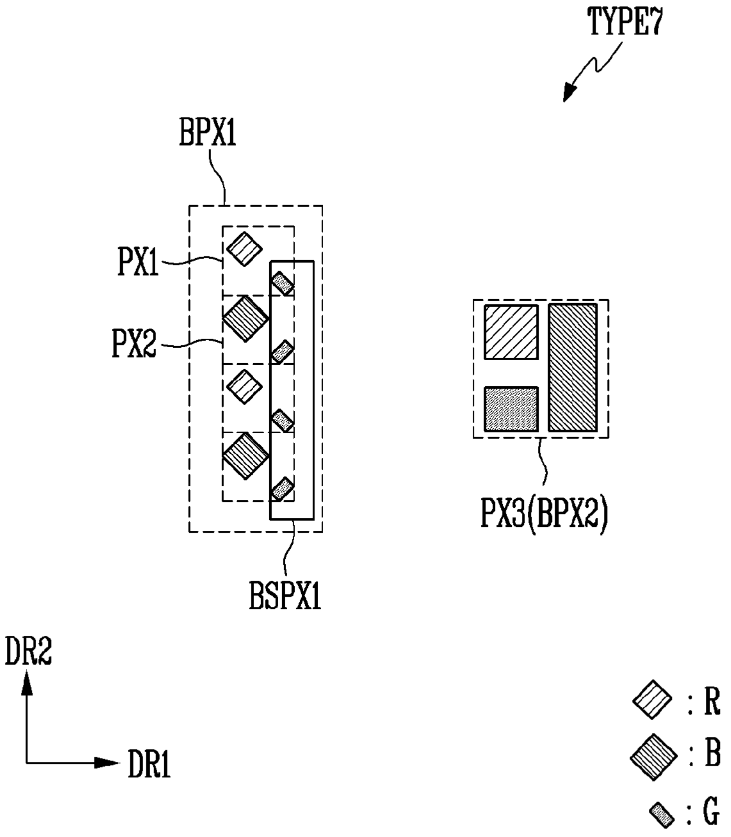

In the seventh boundary type TYPE7, the first boundary pixels BPX1 may be disposed on the left side of the second boundary pixel BPX2 and arranged in the second direction DR2, as illustrated in FIG. 7G. In the seventh boundary type TYPE7, the green (G) subpixels of both of the first pixel PX1 and second pixel PX2 may be closest to the second boundary pixel BPX2. Accordingly, the green (G) subpixels may be determined to be the first boundary subpixels BSPX1, and image data corresponding to the green (G) subpixels may be dimmed.

Figure 7H:
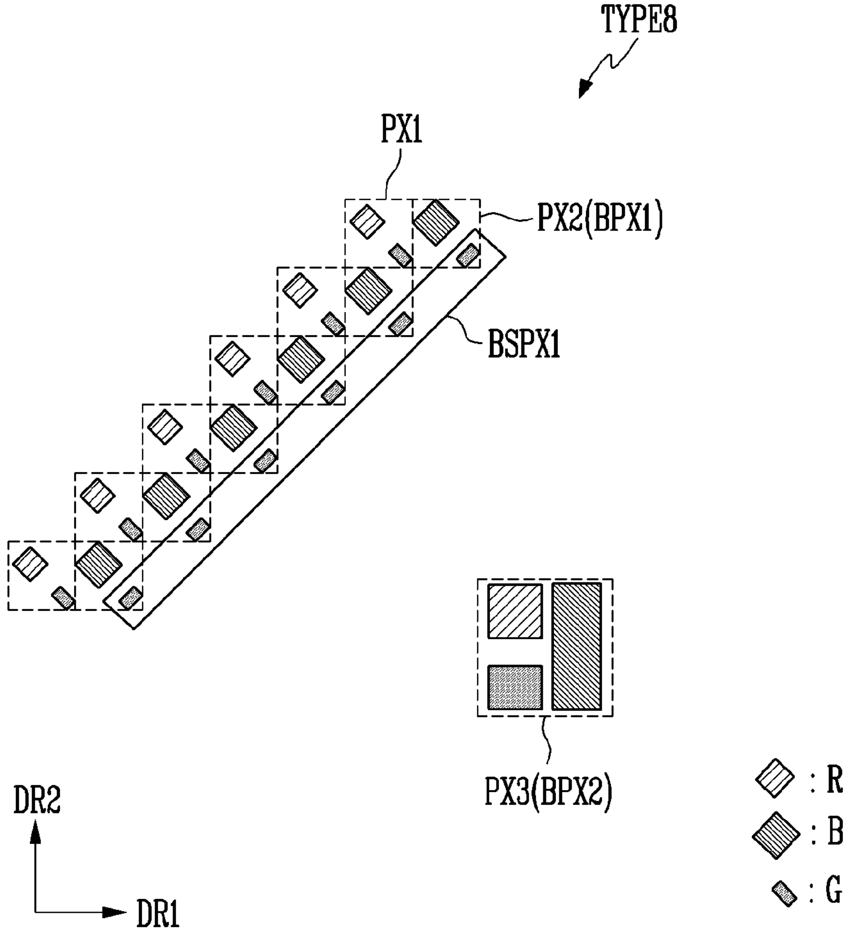

In the eighth boundary type TYPE8, the first boundary pixels BPX1 may be arranged in a diagonal direction from the left side of the second boundary pixel BPX2 to the upper side of the second boundary pixel BPX2, as illustrated in FIG. 7H. In such an embodiment, the green (G) subpixels of the first pixel PX1 or second pixel PX2 may be closest to the second boundary pixel BPX2. Accordingly, the green (G) subpixels may be determined to be the first boundary subpixels BSPX1, and image data corresponding to the green (G) subpixels may be dimmed.

FIG. 8 is a diagram illustrating an embodiment of the boundary subpixel of the second boundary pixel corresponding to the boundary type stored in the lookup table of FIG. 6.

Referring to FIGS. 7A to 7H and FIG. 8, the boundary subpixels of the second boundary pixel BPX2 (hereinafter, referred to as second boundary subpixels BSPX2), which have a subpixel arrangement structure different from that of the first and second pixels PX1 and PX2, may be determined depending on the boundary type.

In an embodiment, as illustrated in FIG. 7A and FIG. 7B, the red (R) subpixel and blue (B) subpixel of the second boundary pixel BPX2 may be adjacent to the first boundary pixels BPX1 in the first boundary type TYPE1 and the second boundary type TYPE2. Accordingly, the red (R) subpixel and the blue (B) subpixel may be determined to be the second boundary subpixels BSPX2 in the first boundary type TYPE1 and the second boundary type TYPE2, and image data corresponding thereto may be dimmed.

In an embodiment, as illustrated in FIG. 7C, the blue (B) subpixel of the second boundary pixel BPX2 may be adjacent to the first boundary pixels BPX1 in the third boundary type TYPE3. Accordingly, the blue (B) subpixel may be determined to be the second boundary subpixel BSPX2 in the third boundary type TYPE3, and image data corresponding thereto may be dimmed.

In an embodiment, as illustrated in FIG. 7D and FIG. 7E, the green (G) subpixel and blue (B) subpixel of the second boundary pixel BPX2 may be adjacent to the first boundary pixels BPX1 in the fourth boundary type TYPE4 and the fifth boundary type TYPE5. Accordingly, the green (G) subpixel and the blue (B) subpixel may be determined to be the second boundary subpixels BSPX2 in the fourth boundary type TYPE4 and the fifth boundary type TYPE5, and image data corresponding thereto may be dimmed.

In an embodiment, as illustrated in FIG. 7F and FIG. 7H, the red (R) subpixel, the green (G) subpixel, and the blue (B) subpixel of the second boundary pixel BPX2 may be adjacent to the first boundary pixels BPX1 in the sixth boundary type TYPE6 and the eighth boundary type TYPE8. Accordingly, the red (R) subpixel, the green (G) subpixel, and the blue (B) subpixel may be determined to be the second boundary subpixels BSPX2 in the sixth boundary type TYPE6 and the eighth boundary type TYPE8, and image data corresponding thereto may be dimmed.

In an embodiment, as illustrated in FIG. 7G, the red (R) subpixel and green (G) subpixel of the second boundary pixel BPX2 may be adjacent to the first boundary pixels BPX1 in the seventh boundary type TYPE7. Accordingly, the red (R) subpixel and green (G) subpixel of the second boundary pixel BPX2 may be determined to be the second boundary subpixels BSPX2, and image data corresponding thereto may be dimmed.

The first boundary subpixel BSPX1 and the second boundary subpixel BSPX2 depending on the boundary types, which are described above with reference to FIGS. 6 to 8, may be summarized as shown in the following Table 1.

TABLE 1

| BOUNDARY TYPE | DIMMING SUBPIXEL (BSPX1) | DIMMING SUBPIXEL (BSPX2) |
|---|---|---|
| TYPE1 | G | R, B |
| TYPE2 | G, B | R, B |
| TYPE3 | R, B | B |
| TYPE4 | R | G, B |
| TYPE5 | R, B | G, B |
| TYPE6 | B, G | R, G, B |
| TYPE7 | G | R, G |
| TYPE8 | G | R, G, B |

In such an embodiment, correction (dimming) of image data for different types of subpixels may be performed as described above depending on the boundary type.

In an embodiment of the invention, as described above, the display device including a plurality of subpixel arrangement structures may subdivide the boundary type of the boundary area between pixel areas including different subpixel arrangement structures, may determine first and second boundary subpixels BSPX1 and BSPX2 based on the relationship of the pixels of the corresponding boundary type, and may perform luminance dimming for the determined first and second boundary subpixels BSPX1 and BSPX2. Thus, without any change of the shapes or sizes of the pixels corresponding to the boundary area, correction of image data for the minimum number of target subpixels may be performed based on the pixel arrangement information. Accordingly, poor image quality resulting from a color band in the boundary area or the like may be improved through the least amount of image data correction.

Figure 10:
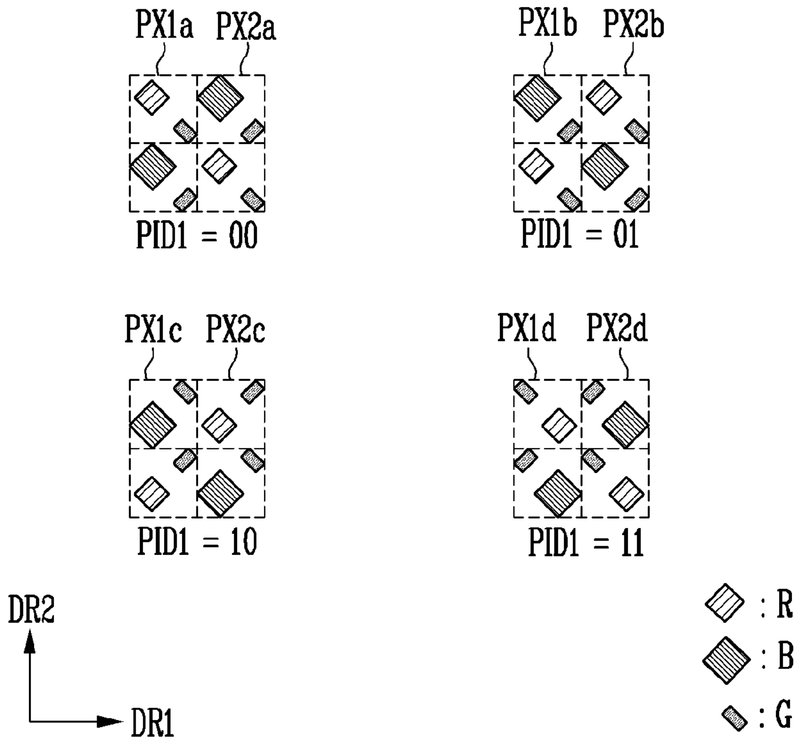
FIG. 10 is a diagram illustrating an embodiment of arrangement structures of subpixels corresponding to a first pixel ID stored in the lookup table of FIG. 9.
Figure 11:
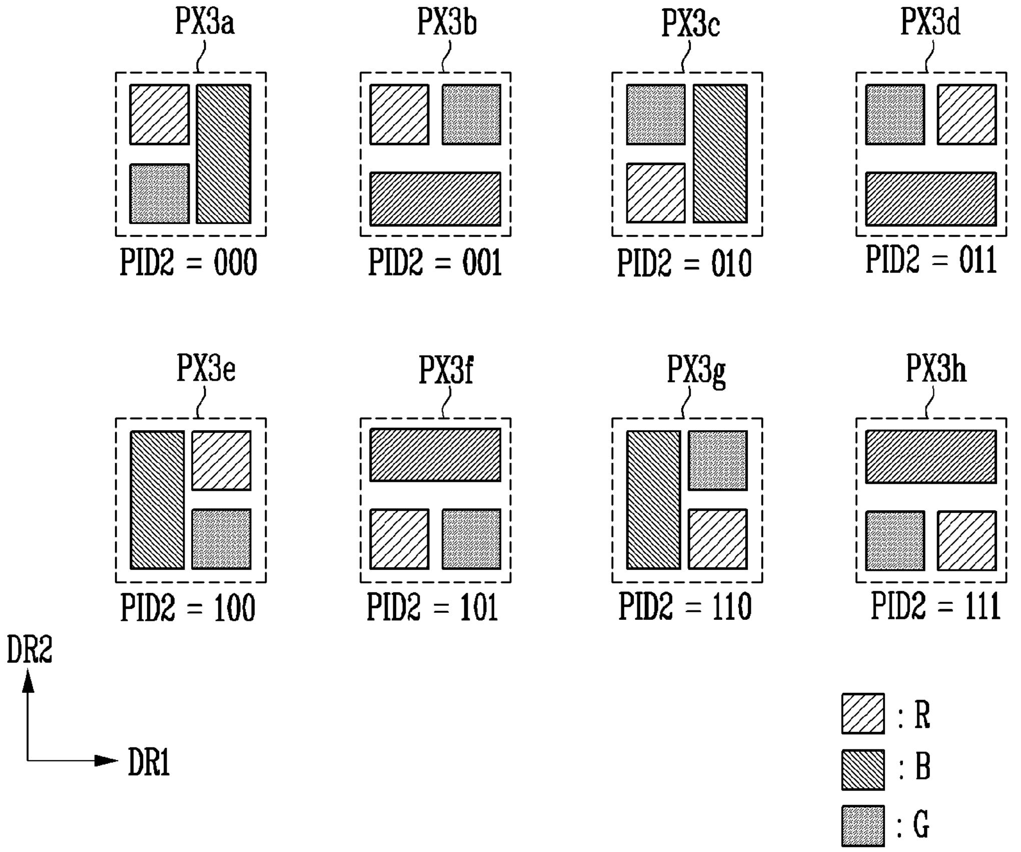
FIG. 11 is a diagram illustrating an embodiment of arrangement structures of subpixels corresponding to a second pixel ID stored in the lookup table of FIG. 9.

FIG. 9 is a diagram illustrating an embodiment of pixel arrangement information included in a lookup table stored in the arrangement information storage of FIG. 4, FIG. 10 is a diagram illustrating an embodiment of the arrangement structures of subpixels corresponding to a first pixel ID stored in the lookup table of FIG. 9, and FIG. 11 is a diagram illustrating an embodiment of the arrangement structures of subpixels corresponding to a second pixel ID stored in the lookup table of FIG. 9.

In FIGS. 9 to 11, the same or like reference numerals are used to indicate the same or like components described with reference to FIGS. 6 to 8, and any repeated detailed description thereof will be omitted. Also, the pixel arrangement information AD of FIG. 9 may be substantially the same or similar to the pixel arrangement information AD of FIG. 6, except that a first pixel identification ("ID") PID1 and a second pixel ID PID2 are added.

Referring to FIG. 4, FIGS. 7A to 7H, FIG. 8, FIG. 9, FIG. 10 and FIG. 11, the arrangement information storage 340 may store pixel arrangement information AD of a first boundary pixel BPX1 in the form of a lookup table LUT.

In such an embodiment, the enable bit EN, the boundary type (TYPE) bit, the row bit Y, and the column bit X are the same as those described above in detail with reference to FIG. 6, and any repeated detailed description will be omitted.

According to an embodiment, the first to third pixels PX1, PX2 and PX3 may be formed to have a structure selected from among various types of subpixel arrangement structures. In such an embodiment, the pixel arrangement information AD may be different from the structure of FIGS. 7A to 7H, and subpixels for which dimming is performed may also be different from those of the structure of FIGS. 7A to 7H. Accordingly, pixel arrangement information AD corresponding to each subpixel arrangement structure and dimming corresponding thereto are desired.

The first pixel ID PID1 may enable the arrangement structure of subpixels included in the first pixel PX1 and second pixel PX2 to be identified. In an embodiment, the first pixel PX1 and the second pixel PX2 may be sorted into four structures, as illustrated in FIG. 10, and the first pixel ID PID1 may be represented using two bits.

In an embodiment of the pixels PX1*a* and PX2*a*, the subpixels of the first row may be arranged in the order of red (R), green (G), blue (B), and green (G), and the subpixels of the second row may be arranged in the order of blue (B), green (G), red (R), and green (G). The red (R) subpixel and the blue (B) subpixel may be disposed on the upper side relative to the green (G) subpixel. The first pixel ID PID1 of the pixels PX1*a* and PX2*a* may be defined as '00'.

In an alternative embodiment of the pixels PX1*b* and PX2*b*, the subpixels of the first row may be arranged in the order of green (G), blue (B), green (G) and red (R), and the subpixels of the second row may be arranged in the order of green (G), red (R), green (G) and blue (B). The red (R) subpixel and the blue (B) subpixel may be disposed on the upper side relative to the green (G) subpixel. The first pixel ID PID1 of the pixels PX1*b* and PX2*b* may be defined as '01'.

In another alternative embodiment of the pixels PX1*c* and PX2*c*, the subpixels of the first row may be arranged in the order of blue (B), green (G), red (R) and green (G), and the subpixels of the second row may be arranged in the order of red (R), green (G), blue (B) and green (G). The red (R) subpixel and the blue (B) subpixel may be disposed on the lower side relative to the green (G) subpixel. The first pixel ID PID1 of the pixels PX1*c* and PX2*c* may be defined as '10'.

In another alternative embodiment of the pixels PX1*d* and PX2*d*, the subpixels of the first row may be arranged in the order of green (G), red (R), green (G) and blue (B), and the subpixels of the second row may be arranged in the order of green (G), blue (B), green (G) and red (R). The red (R) subpixel and the blue (B) subpixel may be disposed on the lower side relative to the green (G) subpixel. The first pixel ID PID1 of the pixels PX1*d* and PX2*d* may be defined as '11'.

The second pixel ID PID2 may enable the arrangement structure of subpixels included in the third pixel PX3 to be identified. In an embodiment, the third pixel PX3 may be sorted into eight structures, as illustrated in FIG. 11, and the second pixel ID PID2 may be represented using three bits.

In an embodiment of the third pixel PX3*a*, a green (G) subpixel and a red (R) subpixel may be sequentially arranged in the second direction DR2, and a blue (B) subpixel may be disposed on the right side of the red (R) subpixel and the green (G) subpixel. The second pixel ID PID2 of the third pixel PX3*a* may be defined as '000'.

In an alternative embodiment of the third pixel PX3*b*, a red (R) subpixel and a green (G) subpixel may be sequentially arranged in the first direction DR1, and a blue (B) subpixel may be disposed on the lower side of the red (R) subpixel and the green (G) subpixel. The second pixel ID PID2 of the third pixel PX3*b* may be defined as '001'.

In another alternative embodiment of the third pixel PX3*c*, a red (R) subpixel and a green (G) subpixel may be sequentially arranged in the second direction DR2, and a blue (B) subpixel may be disposed on the right side of the red (R) subpixel and the green (G) subpixel. The second pixel ID PID2 of the third pixel PX3*c* may be defined as '010'.

In another alternative embodiment of the third pixel PX3*d*, a green (G) subpixel and a red (R) subpixel may be sequentially arranged in the first direction DR1, and a blue (B) subpixel may be disposed on the lower side of the red (R) subpixel and the green (G) subpixel. The second pixel ID PID2 of the third pixel PX3*d* may be defined as '011'.

In another alternative embodiment of the third pixel PX3*e*, a green (G) subpixel and a red (R) subpixel may be sequentially arranged in the second direction DR2, and a blue (B) subpixel may be disposed on the left side of the red (R) subpixel and the green (G) subpixel. The second pixel ID PID2 of the third pixel PX3*e* may be defined as '100'.

In another alternative embodiment of the third pixel PX3*f*, a red (R) subpixel and a green (G) subpixel may be sequentially arranged in the first direction DR1, and a blue (B) subpixel may be disposed on the upper side of the red (R) subpixel and the green (G) subpixel. The second pixel ID PID2 of the third pixel PX3*f* may be defined as '101'.

In another alternative embodiment of the third pixel PX3*g*, a red (R) subpixel and a green (G) subpixel may be sequentially arranged in the second direction DR2, and a blue (B) subpixel may be disposed on the left side of the red (R) subpixel and the green (G) subpixel. The second pixel ID PID2 of the third pixel PX3*g* may be defined as '110'.

In another alternative embodiment of the third pixel PX3*h*, a green (G) subpixel and a red (R) subpixel may be sequentially arranged in the first direction DR1, and a blue (B) subpixel may be disposed on the upper side of the red (R) subpixel and the green (G) subpixel. The second pixel ID PID2 of the third pixel PX3*h* may be defined as '111'.

In one embodiment, for example, the first pixel ID PID1 applied to the boundary types TYPE1 to TYPE8 of FIGS. 7A to 7H may be '00', and the second pixel ID PID2 applied thereto may be '000'. In such an embodiment, if image data dimming described herein is not applied, the image at the upper boundary corresponding to the first boundary type TYPE1 shown in FIG. 7A may be perceived as a greenish color band in which the green color is prominent. Accordingly, image data of the green (G) subpixels of the first and second pixels PX1 and PX2 corresponding to the first boundary type TYPE1 may be dimmed.

In an embodiment, where the first pixel ID PID1 is '10' and the second pixel ID PID2 is '100' (or 000), red (R) subpixels and blue (B) subpixels may converge on the upper boundary corresponding to the first boundary type TYPE1. Here, when image data dimming according to the disclosure is not applied, a pinkish color band in which color similar to magenta is prominent may be perceived so as to correspond to the first boundary type TYPE1. Accordingly, image data of the red (R) subpixels and blue (B) subpixels of the first to third pixels PX1*c*, PX2*c* and PX3*e* corresponding to the first boundary type TYPE1 may be dimmed.

In an embodiment, as described above, the pixel arrangement information AD may include information about the subpixel arrangement structures of the first to third pixels PX1, PX2 and PX3 based on the first pixel ID PID1 and the second pixel ID PID2. Depending on the arrangement structure according to the pixel ID and the position of the boundary area (boundary type), a specific color having a decisive effect may be present, and when image correction therefor is not performed, a color band having the specific color may be perceived in the corresponding boundary.

The dimming processor 360 may correct (or dim) image data corresponding to the boundary subpixels BSPX1 and BSPX2 based on the pixel arrangement information AD.

Accordingly, dimming suitable for boundary subpixels in the boundary area of various structures of a display area may be effectively performed.

Figure 12A:
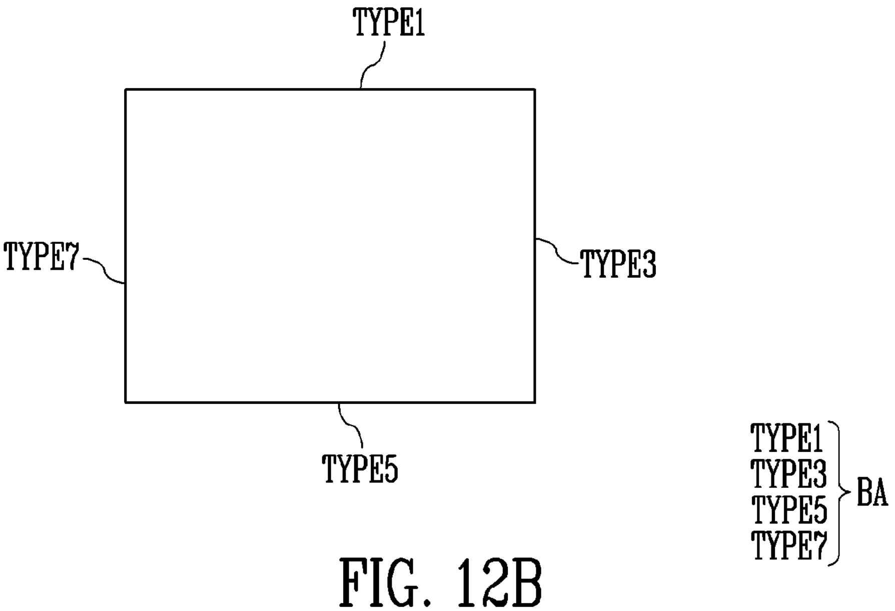
FIGS. 12A and 12B are diagrams illustrating embodiments of the shape of the boundary area between the first pixel area and the second pixel area of a display area, based on which image data correction is performed.
Figure 12B:
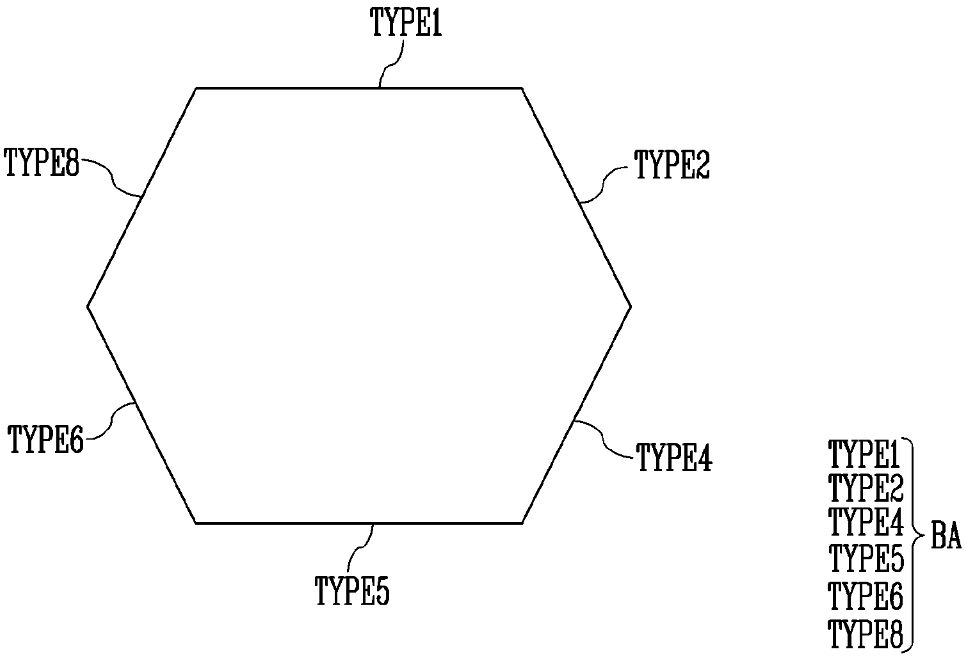

FIG. 12A and FIG. 12B are diagrams illustrating embodiments of the shape of the boundary area between the first pixel area and second pixel area of a display area, based on which image data correction is performed.

Referring to FIG. 4, FIG. 5A, FIG. 5B, FIG. 12A and FIG. 12B, the boundary area BA may have one of various shapes depending on the design of the display area 100.

In an embodiment, the boundary area BA may have a rectangular shape, as illustrated in FIG. 12A. Accordingly, among the above-described boundary types, the first boundary type TYPE1, the third boundary type TYPE3, the fifth boundary type TYPE5, and the seventh boundary type TYPE7 may be applied to image data dimming.

In an alternative embodiment, the boundary area BA may have a hexagonal shape, as illustrated in FIG. 12B. Accordingly, among the above-described boundary types, the first boundary type TYPE1, the second boundary type TYPE2, the fourth boundary type TYPE4, the fifth boundary type TYPE5, the sixth boundary type TYPE6, and the eighth boundary type TYPE8 may be applied to image data dimming.

In embodiments of a display device according to the disclosure, pixel arrangement information stored in an arrangement information storage may subdivide a boundary type for the boundary area of pixel areas including different subpixel arrangement structures and include information for the pixel arrangement of a corresponding boundary type. The pixel arrangement information may include information about boundary subpixels for which dimming is to be performed.

In such embodiments, the display device may perform dimming for a boundary area through grayscale correction based on a luminance ratio preset depending on a boundary type and the grayscale of input image data.

Accordingly, in such embodiment, without changing the shapes or sizes of pixels corresponding to a boundary area and calculation for dimming, image data correction is performed only for target subpixels (that is, boundary subpixels) based on the stored pixel arrangement information and luminance ratio information, such that image quality deterioration due to a color band in the boundary area between different pixel arrangement structures may be improved.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel comprising a first pixel area including subpixels of a first pixel arrangement, and a second pixel area including subpixels of a second pixel arrangement different from the first pixel arrangement, wherein the second pixel area overlaps a sensor disposed below the display panel to receive light passing through the second pixel area, and the first pixel area is disposed peripheral to the second pixel area;

a processor to convert first image data to second image data, wherein the first image data corresponds to at least one of the subpixels of the first pixel area adjacent to the second pixel area, and at least one of the subpixels of the second pixel area adjacent to the first pixel area; and a display driver to provide driving signals to the display panel based on the second image data, wherein each of the subpixels of the second pixel area is larger than each of the subpixels of the first pixel area.

2. The display device of claim 1, wherein the processor is configured to perform dimming for the first image data to lower luminance of the at least one of the subpixels of the first pixel area adjacent to the second pixel area and to lower luminance of the at least one of the subpixels of the second pixel area adjacent to the first pixel area.

3. The display device of claim 1, wherein the second pixel area has a resolution lower than a resolution of the first pixel area.

4. The display device of claim 1, wherein the second pixel area has an aperture ratio greater than an aperture ratio of the first pixel area.

5. The display device of claim 1, wherein the at least one of the subpixels of the first pixel area adjacent to the second pixel area comprises first edge subpixels located at an edge of the first pixel area adjacent to the second pixel area, and wherein the at least one of the subpixels of the second pixel area adjacent to the first pixel area comprises second edge subpixels located at an edge of the second pixel area adjacent to the first pixel area.

6. The display device of claim 5, wherein first data signals supplied to the first edge subpixels according to the first image data have grayscales lower than grayscales of second data signals supplied to other ones of the subpixels of the first pixel area according to an input image data the same as the first image data, and wherein the driving signals comprise the first data signals and the second data signals.

7. The display device of claim 5, wherein first data signals supplied to the second edge subpixels according to the first image data have grayscales lower than grayscales of second data signals supplied to other ones of the subpixels of the second pixel area according to an input image data the same as the first image data, and wherein the driving signals comprise first data signals and second data signals.

8. The display device of claim 5, wherein:

the first pixel area comprises first pixels including the subpixels of the first pixel arrangement;

the second pixel area comprises second pixels including the subpixels of the second pixel arrangement;

at least one of the first pixels located at the edge of the first pixel area comprises the first edge subpixels; and at least one of the second pixels located at the edge of the second pixel area comprises the second edge subpixels.

9. The display device of claim 8, wherein a distance between the first pixels is less than a distance between the second pixels.

10. The display device of claim 8, wherein a distance between one of the first edge subpixels and one of the second edge subpixels is less than a distance between the second pixels.

11. The display device of claim 8, wherein a distance between one of the first edge subpixels and one of the second edge subpixels is greater than a distance between the first pixels.

12. The display device of claim 8, wherein:

the first pixels comprise a third pixel including a first subpixel and a second subpixel, and a fourth pixel including a third subpixel and a fourth subpixel, the third pixel and the fourth pixel being alternately arranged;

the first subpixel is configured to display a first color of light, the second subpixel and the fourth subpixel are configured to display a second color of light, and the third subpixel is configured to display a third color of light, and the first color of light, the second color of light, and the third color of light are different from each other.

13. The display device of claim 12, wherein:

the second pixels each comprises a fifth subpixel, a sixth subpixel and a seventh subpixel to display different colors of light from each other; and wherein the fifth, sixth, and seventh subpixels have sizes greater than sizes of the first, second, third, and fourth subpixels.

14. The display device of claim 1, wherein:

the first pixel area comprises first subpixel units including the subpixels of the first pixel area and first transistors;

the second pixel area comprises second subpixel units including the subpixels of the second pixel area and second transistors;

the subpixels of the first pixel area each has a first light-emission area; and the subpixels of the second pixel area each has a second light-emission area.

15. A display device comprising:

a display panel comprising first pixels including first subpixels in a first pixel area and second pixels including second subpixels in a second pixel area, wherein the second pixel area overlaps a sensor disposed below the display panel to receive light passing through the second pixel area, and the first pixel area is disposed peripheral to the second pixel area;

a processor to convert first image data to second image data, wherein the first image data corresponds to at least one of the first subpixels of a first edge pixel of the first pixels and at least one of the second subpixels of a second edge pixel of the second pixels; and a display driver to provide driving signals to the display panel based on the second image data, wherein:

the first edge pixel is located at an edge of the first pixel area adjacent to the second pixel area;

the second edge pixel is located at an edge of the second pixel area adjacent to the first pixel area; and each of the second subpixels is larger than each of the first subpixels in the unit area.

16. The display device of claim 15, further comprising a storage medium to store pixel arrangement information, wherein the processor is configured to select at least one from the first subpixels of the first edge pixel and to perform dimming for the first image data to lower luminance of the selected first subpixel.

17. The display device of claim 15, further comprising a storage medium to store pixel arrangement information, wherein the processor is configured to select at least one from the second subpixels of the second edge pixel and to perform dimming for the first image data to lower luminance of the selected second subpixel.

18. The display device of claim 15, wherein:

the first pixels comprise first subpixel units including the first subpixels and first transistors;

the second pixels comprise second subpixel units including the second subpixels and second transistors;

the first subpixels each has a first light-emission area; and the second subpixels each has a second light-emission area.

* * * * *